US012567396B2

(12) United States Patent
Kuhn et al.

(10) Patent No.: US 12,567,396 B2
(45) Date of Patent: Mar. 3, 2026

(54) OUTPUT-BASED ATTRIBUTION FOR CONTENT, INCLUDING MUSICAL CONTENT, GENERATED BY AN ARTIFICIAL INTELLIGENCE (AI)

(71) Applicant: Sureel Inc., Pacifica, CA (US)

(72) Inventors: Christopher Benjamin Kuhn, Munich (DE); Tamay Aykut, Los Angeles, CA (US)

(73) Assignee: Sureel Inc., Pacifica, CA (US)

( * ) Notice: Subject to any disclaimer, the term of this patent is extended or adjusted under 35 U.S.C. 154(b) by 0 days.

(21) Appl. No.: 19/218,548

(22) Filed: May 26, 2025

(65) Prior Publication Data

US 2025/0285605 A1     Sep. 11, 2025

Related U.S. Application Data

(63) Continuation-in-part of application No. 18/242,898, filed on Sep. 6, 2023, now Pat. No. 12,314,308.

(51) Int. Cl.
*G10H 1/00* (2006.01)
*G06Q 20/10* (2012.01)

(52) U.S. Cl.
CPC ......... *G10H 1/0025* (2013.01); *G06Q 20/102* (2013.01); *G10H 1/0066* (2013.01); *G10H 2210/056* (2013.01); *G10H 2210/066* (2013.01); *G10H 2210/111* (2013.01); *G10H 2240/056* (2013.01)

(58) Field of Classification Search
CPC ............... G10H 1/0025; G10H 1/0066; G10H 2210/056; G10H 2210/066; G10H 2210/111; G10H 2240/056; G06Q 20/102

USPC .......................................................... 84/602
See application file for complete search history.

(56) References Cited

U.S. PATENT DOCUMENTS

| | | | | |
|---|---|---|---|---|
| 7,639,386 B1 * | 12/2009 | Siegel | .................... | G06Q 40/03 |
| | | | | 358/1.18 |
| 11,244,032 B1 * | 2/2022 | Nguyen | ................. | G06F 9/547 |
| 12,346,367 B2 * | 7/2025 | O'Neill | ................... | G06F 16/45 |
| 2002/0112171 A1 * | 8/2002 | Ginter | ............... | H04N 21/6581 |
| | | | | 375/E7.009 |
| 2006/0112098 A1 * | 5/2006 | Renshaw | ............. | G06F 16/639 |

(Continued)

*Primary Examiner* — Christina M Schreiber
(74) *Attorney, Agent, or Firm* — Shivshanker Naimpally

(57) ABSTRACT

In some aspects, a music-based output produced by a generative artificial intelligence is segmented into multiple segments. An encoder is used to generate multiple output embedding. Individual output embeddings of the multiple output embeddings are derived from individual segments of the multiple segments. A distance measurement between individual output embeddings of the multiple embeddings and individual training segment embeddings of multiple training segment embeddings is determined to create a set of distance measurements. The plurality of distance measurements is correlated to a plurality of content creators that created multiple content items used to train the generative artificial intelligence. One or more creator attributions are determined based at least in part on the correlating. A creator attribution vector that includes the one or more creator attributions is determined and compensation is provided to one or more content creators of the plurality of content creators based on the creator attribution vector.

20 Claims, 13 Drawing Sheets

(56) References Cited

U.S. PATENT DOCUMENTS

| | | | | |
|---|---|---|---|---|
| 2010/0050854 A1* | 3/2010 | Huet | .................... | G10H 1/0025 |
| | | | | 84/611 |
| 2014/0338515 A1* | 11/2014 | Sheffer | .................... | G10H 1/36 |
| | | | | 84/609 |
| 2015/0127669 A1* | 5/2015 | Roy | ..................... | G06F 16/683 |
| | | | | 707/769 |
| 2016/0147864 A1* | 5/2016 | Kane | ................. | G06Q 30/0206 |
| | | | | 707/723 |
| 2017/0220545 A1* | 8/2017 | Gururajan | ............. | G06F 40/106 |
| 2022/0043965 A1* | 2/2022 | Dvorak | ................. | G06F 40/103 |
| 2022/0350828 A1* | 11/2022 | Ma | ...................... | G06F 16/3347 |
| 2022/0398538 A1* | 12/2022 | Jakobsson | ............. | H04L 9/3213 |
| 2023/0075884 A1* | 3/2023 | Jakobsson | ................. | H04L 9/50 |
| 2024/0152544 A1* | 5/2024 | Aykut | .................. | G06N 3/0475 |
| 2024/0193204 A1* | 6/2024 | Kuhn | .................. | G06N 3/0475 |
| 2024/0256592 A1* | 8/2024 | O'Neill | ................. | G06F 16/435 |
| 2024/0281463 A1* | 8/2024 | Aykut | .................... | G06N 3/096 |
| 2024/0412542 A1* | 12/2024 | O'Neill | ................. | G06V 10/25 |
| 2024/0419720 A1* | 12/2024 | Kuhn | .................... | G06N 3/094 |
| 2024/0419949 A1* | 12/2024 | Aykut | .................. | G06N 3/047 |
| 2025/0285605 A1* | 9/2025 | Kuhn | .................. | G10H 1/0025 |

* cited by examiner

300

Figure 4:
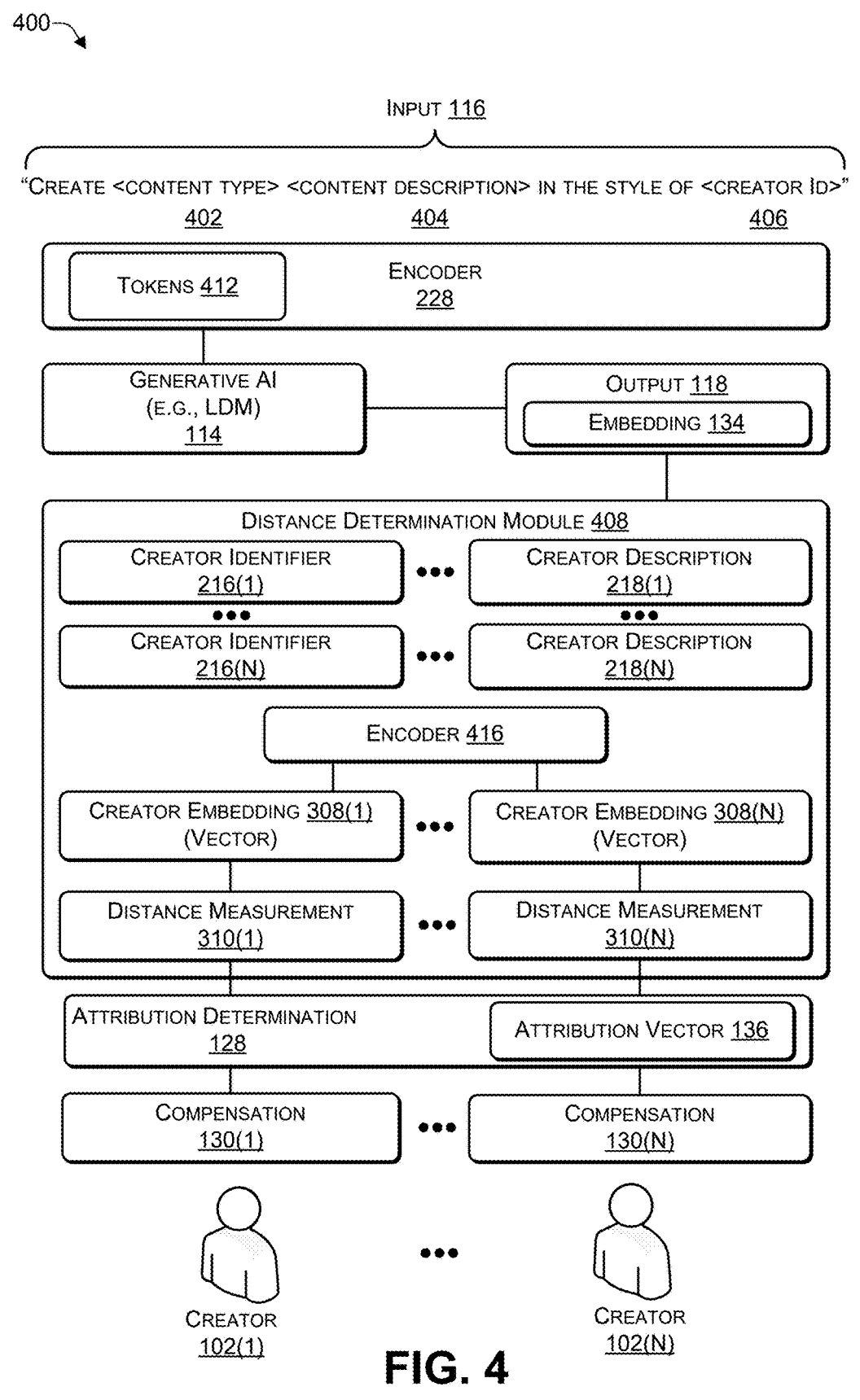

400

INPUT 116

"CREATE <CONTENT TYPE> <CONTENT DESCRIPTION> IN THE STYLE OF <CREATOR ID>"
402　　　　　　　　404　　　　　　　　406

TOKENS 412　　　　ENCODER 228

GENERATIVE AI
(E.G., LDM)
114

OUTPUT 118
EMBEDDING 134

DISTANCE DETERMINATION MODULE 408

CREATOR IDENTIFIER 216(1) ••• CREATOR DESCRIPTION 218(1)

•••　　　　　　　•••

CREATOR IDENTIFIER 216(N) ••• CREATOR DESCRIPTION 218(N)

ENCODER 416

CREATOR EMBEDDING 308(1) (VECTOR) ••• CREATOR EMBEDDING 308(N) (VECTOR)

DISTANCE MEASUREMENT 310(1) ••• DISTANCE MEASUREMENT 310(N)

ATTRIBUTION DETERMINATION 128 ATTRIBUTION VECTOR 136

COMPENSATION 130(1) ••• COMPENSATION 130(N)

CREATOR 102(1)　　•••　　CREATOR 102(N)

INPUT 116

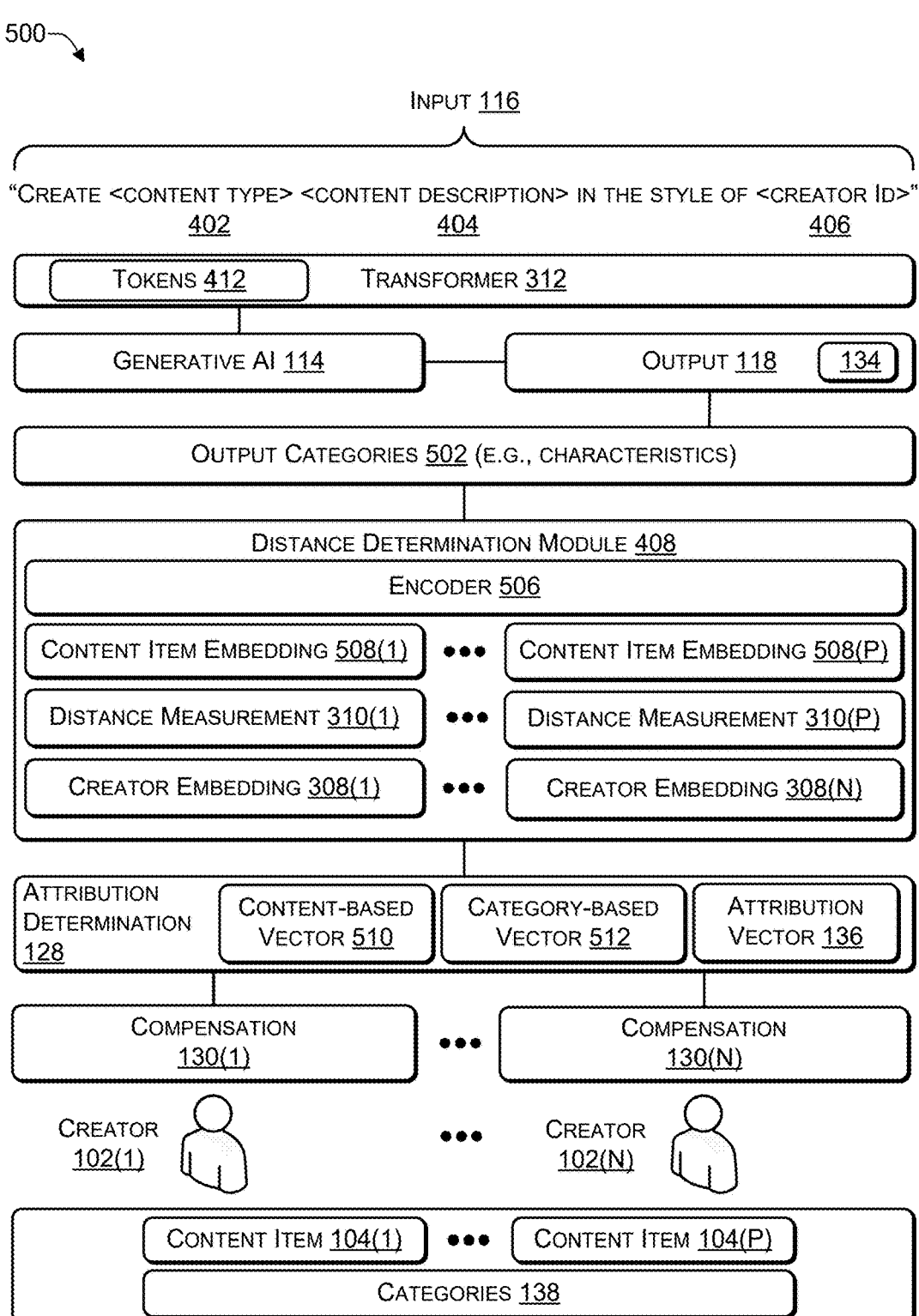

"CREATE <CONTENT TYPE> <CONTENT DESCRIPTION> IN THE STYLE OF <CREATOR ID>"
402              404                    406

TOKENS 412        TRANSFORMER 312

GENERATIVE AI 114              OUTPUT 118        134

OUTPUT CATEGORIES 502 (E.G., CHARACTERISTICS)

DISTANCE DETERMINATION MODULE 408

ENCODER 506

CONTENT ITEM EMBEDDING 508(1)  •••  CONTENT ITEM EMBEDDING 508(P)

DISTANCE MEASUREMENT 310(1)  •••  DISTANCE MEASUREMENT 310(P)

CREATOR EMBEDDING 308(1)  •••  CREATOR EMBEDDING 308(N)

ATTRIBUTION DETERMINATION 128 | CONTENT-BASED VECTOR 510 | CATEGORY-BASED VECTOR 512 | ATTRIBUTION VECTOR 136

COMPENSATION 130(1)  •••  COMPENSATION 130(N)

CREATOR 102(1)  •••  CREATOR 102(N)

CONTENT ITEM 104(1)  •••  CONTENT ITEM 104(P)

CATEGORIES 138

Figure 6:
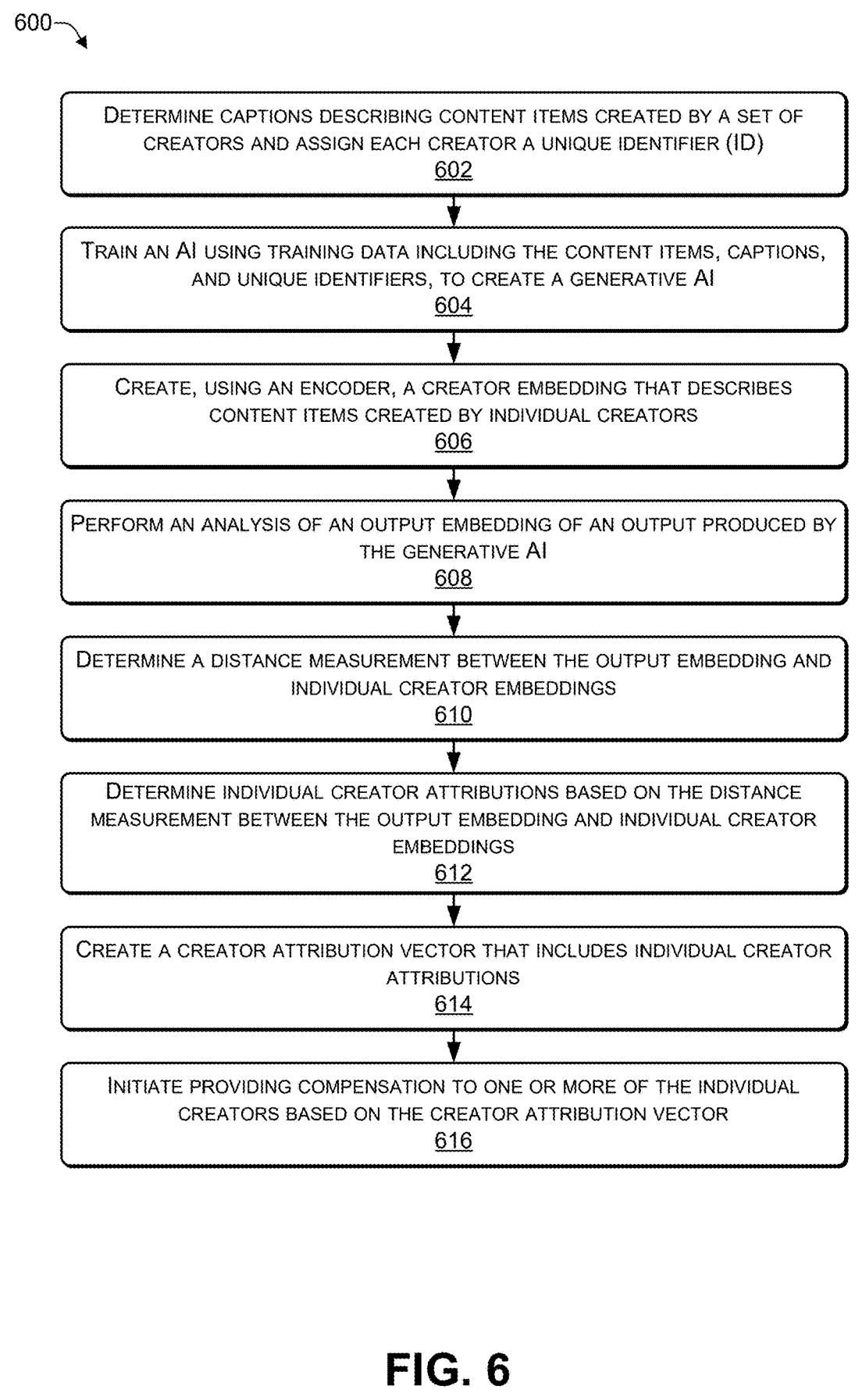

DETERMINE CAPTIONS DESCRIBING CONTENT ITEMS CREATED BY A SET OF CREATORS AND ASSIGN EACH CREATOR A UNIQUE IDENTIFIER (ID)
602

TRAIN AN AI USING TRAINING DATA INCLUDING THE CONTENT ITEMS, CAPTIONS, AND UNIQUE IDENTIFIERS, TO CREATE A GENERATIVE AI
604

CREATE, USING AN ENCODER, A CREATOR EMBEDDING THAT DESCRIBES CONTENT ITEMS CREATED BY INDIVIDUAL CREATORS
606

PERFORM AN ANALYSIS OF AN OUTPUT EMBEDDING OF AN OUTPUT PRODUCED BY THE GENERATIVE AI
608

DETERMINE A DISTANCE MEASUREMENT BETWEEN THE OUTPUT EMBEDDING AND INDIVIDUAL CREATOR EMBEDDINGS
610

DETERMINE INDIVIDUAL CREATOR ATTRIBUTIONS BASED ON THE DISTANCE MEASUREMENT BETWEEN THE OUTPUT EMBEDDING AND INDIVIDUAL CREATOR EMBEDDINGS
612

CREATE A CREATOR ATTRIBUTION VECTOR THAT INCLUDES INDIVIDUAL CREATOR ATTRIBUTIONS
614

INITIATE PROVIDING COMPENSATION TO ONE OR MORE OF THE INDIVIDUAL CREATORS BASED ON THE CREATOR ATTRIBUTION VECTOR
616

Figure 7:
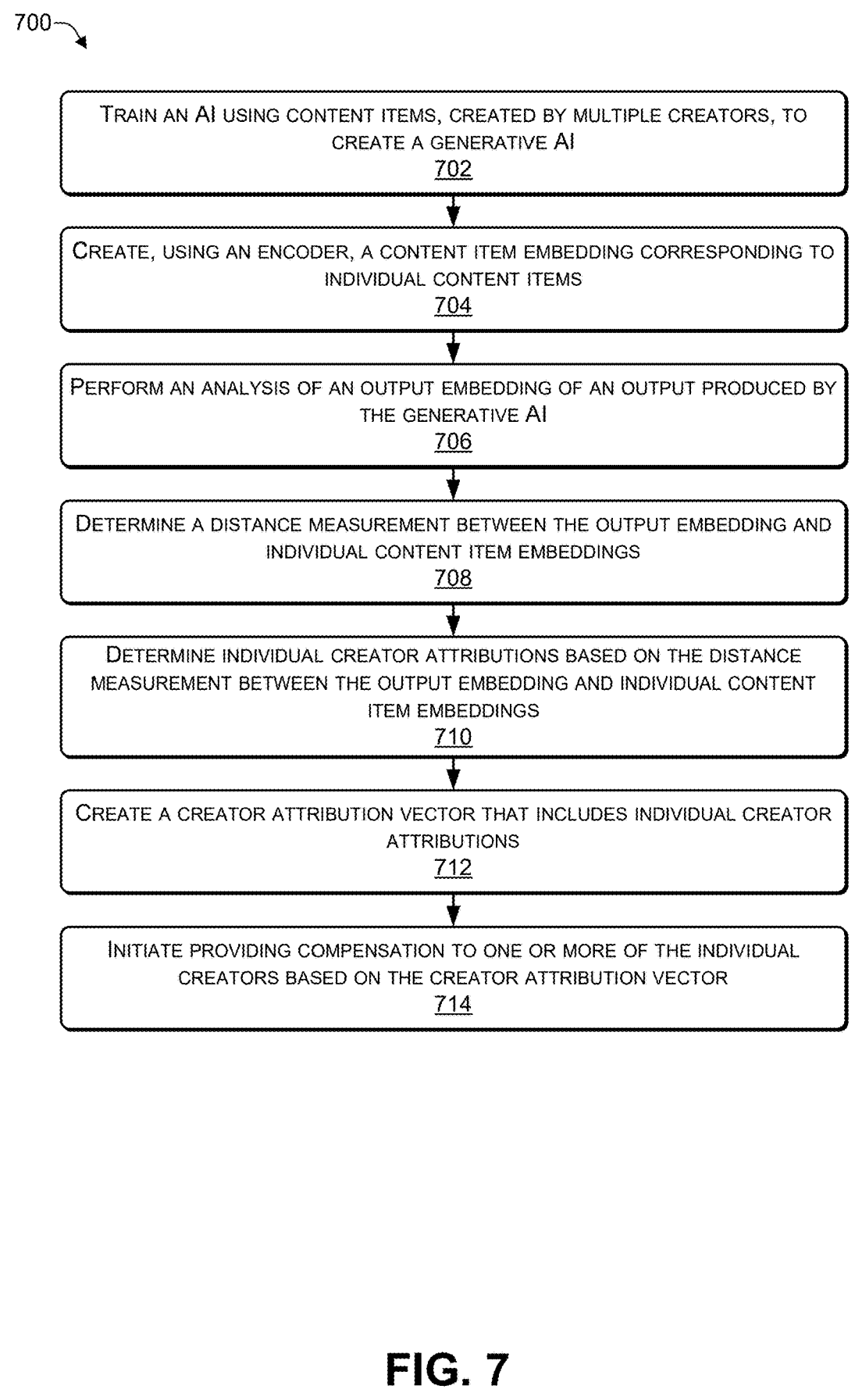

TRAIN AN AI USING CONTENT ITEMS, CREATED BY MULTIPLE CREATORS, TO
CREATE A GENERATIVE AI
702

CREATE, USING AN ENCODER, A CONTENT ITEM EMBEDDING CORRESPONDING TO
INDIVIDUAL CONTENT ITEMS
704

PERFORM AN ANALYSIS OF AN OUTPUT EMBEDDING OF AN OUTPUT PRODUCED BY
THE GENERATIVE AI
706

DETERMINE A DISTANCE MEASUREMENT BETWEEN THE OUTPUT EMBEDDING AND
INDIVIDUAL CONTENT ITEM EMBEDDINGS
708

DETERMINE INDIVIDUAL CREATOR ATTRIBUTIONS BASED ON THE DISTANCE
MEASUREMENT BETWEEN THE OUTPUT EMBEDDING AND INDIVIDUAL CONTENT
ITEM EMBEDDINGS
710

CREATE A CREATOR ATTRIBUTION VECTOR THAT INCLUDES INDIVIDUAL CREATOR
ATTRIBUTIONS
712

INITIATE PROVIDING COMPENSATION TO ONE OR MORE OF THE INDIVIDUAL
CREATORS BASED ON THE CREATOR ATTRIBUTION VECTOR
714

Figure 8:
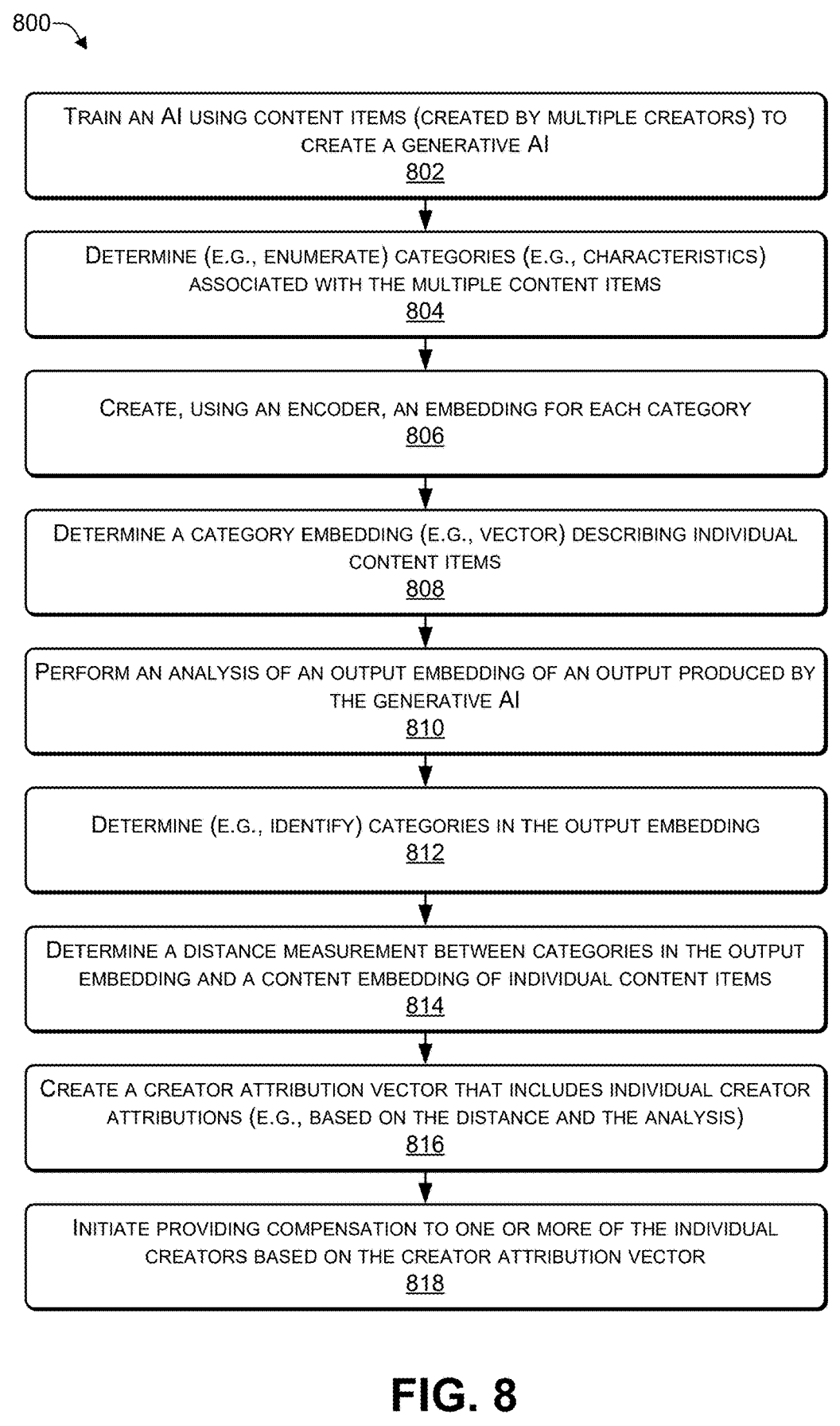

TRAIN AN AI USING CONTENT ITEMS (CREATED BY MULTIPLE CREATORS) TO
CREATE A GENERATIVE AI
802

DETERMINE (E.G., ENUMERATE) CATEGORIES (E.G., CHARACTERISTICS)
ASSOCIATED WITH THE MULTIPLE CONTENT ITEMS
804

CREATE, USING AN ENCODER, AN EMBEDDING FOR EACH CATEGORY
806

DETERMINE A CATEGORY EMBEDDING (E.G., VECTOR) DESCRIBING INDIVIDUAL
CONTENT ITEMS
808

PERFORM AN ANALYSIS OF AN OUTPUT EMBEDDING OF AN OUTPUT PRODUCED BY
THE GENERATIVE AI
810

DETERMINE (E.G., IDENTIFY) CATEGORIES IN THE OUTPUT EMBEDDING
812

DETERMINE A DISTANCE MEASUREMENT BETWEEN CATEGORIES IN THE OUTPUT
EMBEDDING AND A CONTENT EMBEDDING OF INDIVIDUAL CONTENT ITEMS
814

CREATE A CREATOR ATTRIBUTION VECTOR THAT INCLUDES INDIVIDUAL CREATOR
ATTRIBUTIONS (E.G., BASED ON THE DISTANCE AND THE ANALYSIS)
816

INITIATE PROVIDING COMPENSATION TO ONE OR MORE OF THE INDIVIDUAL
CREATORS BASED ON THE CREATOR ATTRIBUTION VECTOR
818

Figure 11:
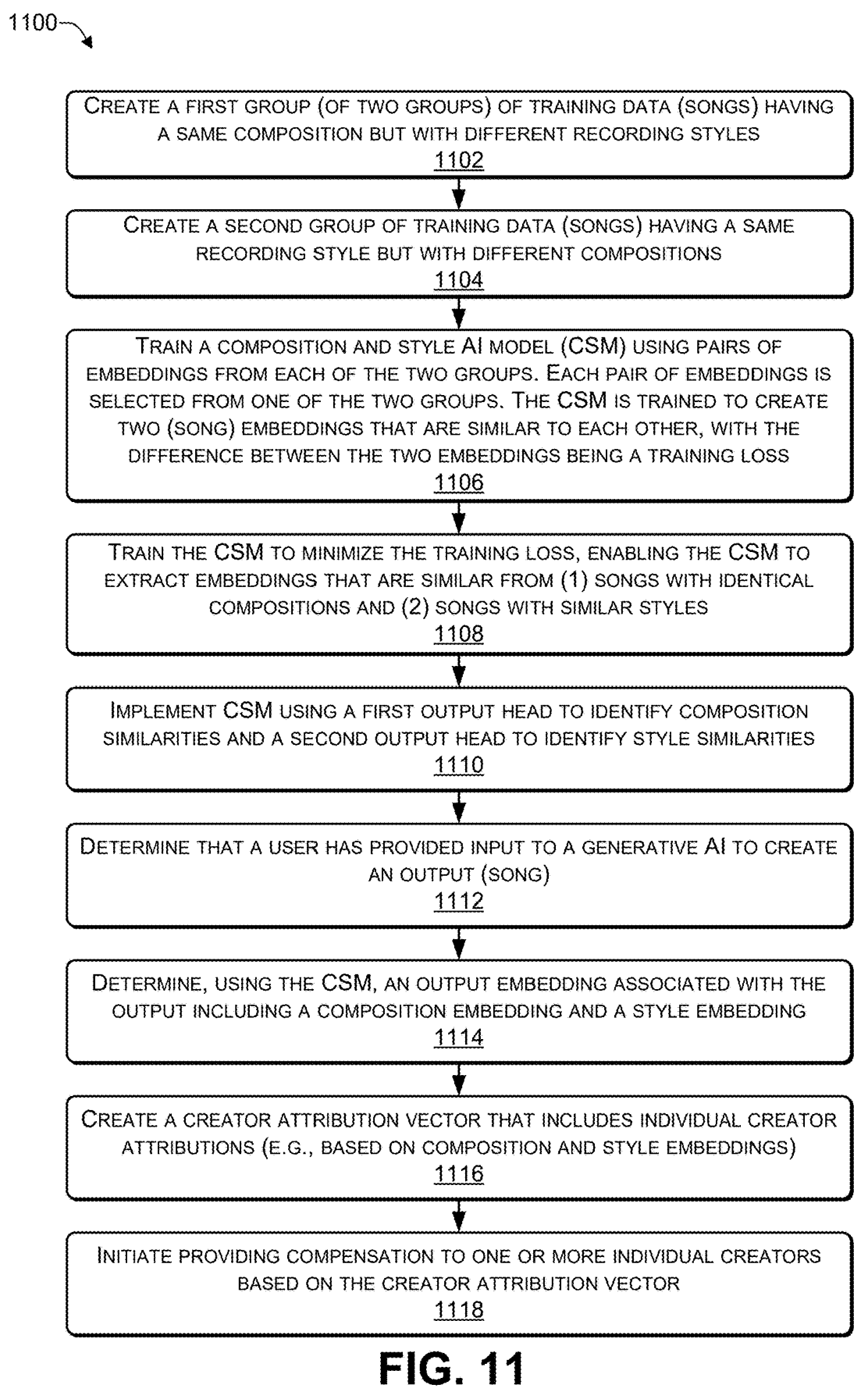

CREATE A FIRST GROUP (OF TWO GROUPS) OF TRAINING DATA (SONGS) HAVING A SAME COMPOSITION BUT WITH DIFFERENT RECORDING STYLES
1102

↓

CREATE A SECOND GROUP OF TRAINING DATA (SONGS) HAVING A SAME RECORDING STYLE BUT WITH DIFFERENT COMPOSITIONS
1104

↓

TRAIN A COMPOSITION AND STYLE AI MODEL (CSM) USING PAIRS OF EMBEDDINGS FROM EACH OF THE TWO GROUPS. EACH PAIR OF EMBEDDINGS IS SELECTED FROM ONE OF THE TWO GROUPS. THE CSM IS TRAINED TO CREATE TWO (SONG) EMBEDDINGS THAT ARE SIMILAR TO EACH OTHER, WITH THE DIFFERENCE BETWEEN THE TWO EMBEDDINGS BEING A TRAINING LOSS
1106

↓

TRAIN THE CSM TO MINIMIZE THE TRAINING LOSS, ENABLING THE CSM TO EXTRACT EMBEDDINGS THAT ARE SIMILAR FROM (1) SONGS WITH IDENTICAL COMPOSITIONS AND (2) SONGS WITH SIMILAR STYLES
1108

↓

IMPLEMENT CSM USING A FIRST OUTPUT HEAD TO IDENTIFY COMPOSITION SIMILARITIES AND A SECOND OUTPUT HEAD TO IDENTIFY STYLE SIMILARITIES
1110

↓

DETERMINE THAT A USER HAS PROVIDED INPUT TO A GENERATIVE AI TO CREATE AN OUTPUT (SONG)
1112

↓

DETERMINE, USING THE CSM, AN OUTPUT EMBEDDING ASSOCIATED WITH THE OUTPUT INCLUDING A COMPOSITION EMBEDDING AND A STYLE EMBEDDING
1114

↓

CREATE A CREATOR ATTRIBUTION VECTOR THAT INCLUDES INDIVIDUAL CREATOR ATTRIBUTIONS (E.G., BASED ON COMPOSITION AND STYLE EMBEDDINGS)
1116

↓

INITIATE PROVIDING COMPENSATION TO ONE OR MORE INDIVIDUAL CREATORS BASED ON THE CREATOR ATTRIBUTION VECTOR
1118

Figure 12:
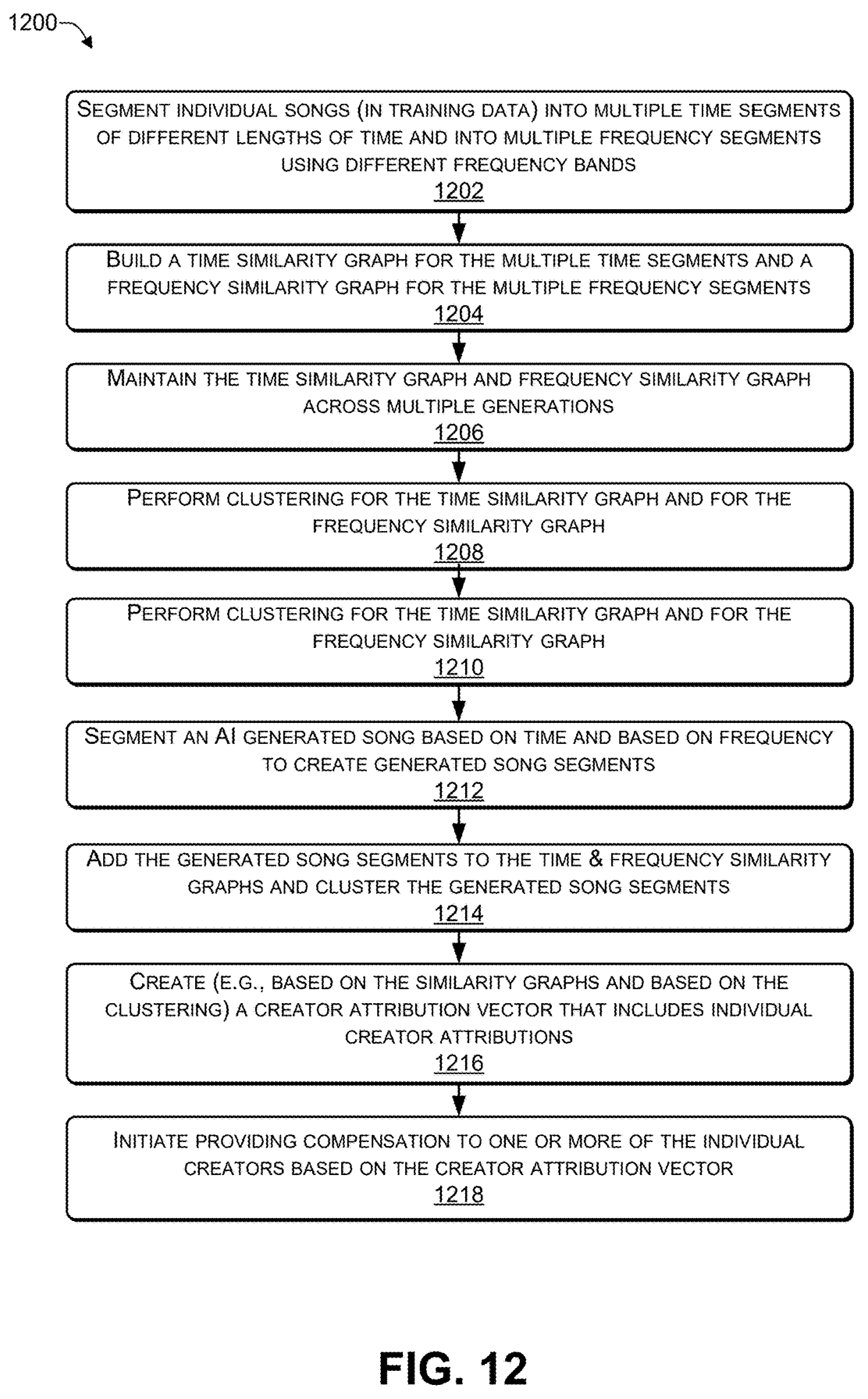

SEGMENT INDIVIDUAL SONGS (IN TRAINING DATA) INTO MULTIPLE TIME SEGMENTS OF DIFFERENT LENGTHS OF TIME AND INTO MULTIPLE FREQUENCY SEGMENTS USING DIFFERENT FREQUENCY BANDS
1202

BUILD A TIME SIMILARITY GRAPH FOR THE MULTIPLE TIME SEGMENTS AND A FREQUENCY SIMILARITY GRAPH FOR THE MULTIPLE FREQUENCY SEGMENTS
1204

MAINTAIN THE TIME SIMILARITY GRAPH AND FREQUENCY SIMILARITY GRAPH ACROSS MULTIPLE GENERATIONS
1206

PERFORM CLUSTERING FOR THE TIME SIMILARITY GRAPH AND FOR THE FREQUENCY SIMILARITY GRAPH
1208

PERFORM CLUSTERING FOR THE TIME SIMILARITY GRAPH AND FOR THE FREQUENCY SIMILARITY GRAPH
1210

SEGMENT AN AI GENERATED SONG BASED ON TIME AND BASED ON FREQUENCY TO CREATE GENERATED SONG SEGMENTS
1212

ADD THE GENERATED SONG SEGMENTS TO THE TIME & FREQUENCY SIMILARITY GRAPHS AND CLUSTER THE GENERATED SONG SEGMENTS
1214

CREATE (E.G., BASED ON THE SIMILARITY GRAPHS AND BASED ON THE CLUSTERING) A CREATOR ATTRIBUTION VECTOR THAT INCLUDES INDIVIDUAL CREATOR ATTRIBUTIONS
1216

INITIATE PROVIDING COMPENSATION TO ONE OR MORE OF THE INDIVIDUAL CREATORS BASED ON THE CREATOR ATTRIBUTION VECTOR
1218

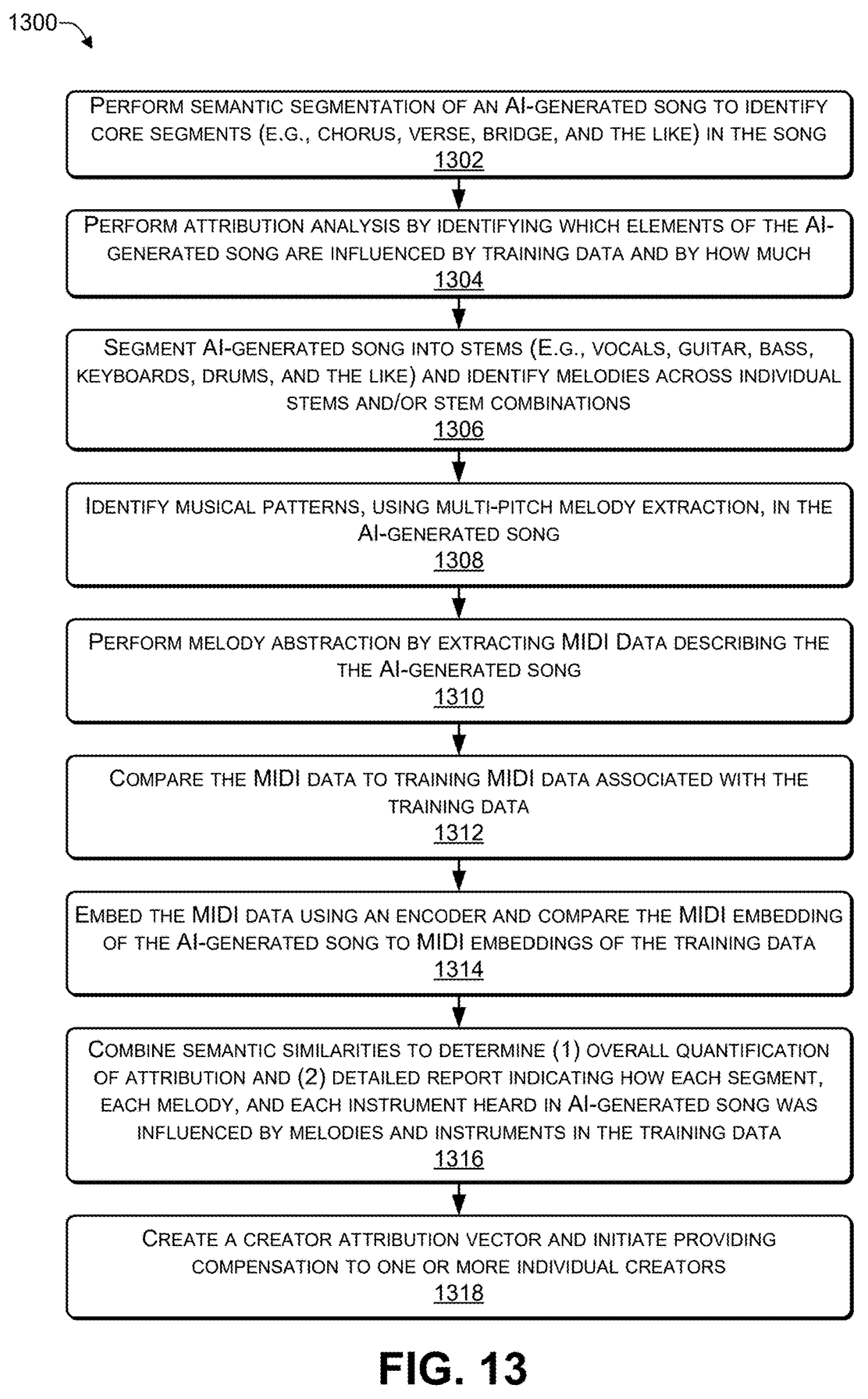

PERFORM SEMANTIC SEGMENTATION OF AN AI-GENERATED SONG TO IDENTIFY
CORE SEGMENTS (E.G., CHORUS, VERSE, BRIDGE, AND THE LIKE) IN THE SONG
1302

PERFORM ATTRIBUTION ANALYSIS BY IDENTIFYING WHICH ELEMENTS OF THE AI-
GENERATED SONG ARE INFLUENCED BY TRAINING DATA AND BY HOW MUCH
1304

SEGMENT AI-GENERATED SONG INTO STEMS (E.G., VOCALS, GUITAR, BASS,
KEYBOARDS, DRUMS, AND THE LIKE) AND IDENTIFY MELODIES ACROSS INDIVIDUAL
STEMS AND/OR STEM COMBINATIONS
1306

IDENTIFY MUSICAL PATTERNS, USING MULTI-PITCH MELODY EXTRACTION, IN THE
AI-GENERATED SONG
1308

PERFORM MELODY ABSTRACTION BY EXTRACTING MIDI DATA DESCRIBING THE
THE AI-GENERATED SONG
1310

COMPARE THE MIDI DATA TO TRAINING MIDI DATA ASSOCIATED WITH THE
TRAINING DATA
1312

EMBED THE MIDI DATA USING AN ENCODER AND COMPARE THE MIDI EMBEDDING
OF THE AI-GENERATED SONG TO MIDI EMBEDDINGS OF THE TRAINING DATA
1314

COMBINE SEMANTIC SIMILARITIES TO DETERMINE (1) OVERALL QUANTIFICATION
OF ATTRIBUTION AND (2) DETAILED REPORT INDICATING HOW EACH SEGMENT,
EACH MELODY, AND EACH INSTRUMENT HEARD IN AI-GENERATED SONG WAS
INFLUENCED BY MELODIES AND INSTRUMENTS IN THE TRAINING DATA
1316

CREATE A CREATOR ATTRIBUTION VECTOR AND INITIATE PROVIDING
COMPENSATION TO ONE OR MORE INDIVIDUAL CREATORS
1318

FIG. 13

OUTPUT-BASED ATTRIBUTION FOR CONTENT, INCLUDING MUSICAL CONTENT, GENERATED BY AN ARTIFICIAL INTELLIGENCE (AI)

CROSS-REFERENCE TO RELATED APPLICATIONS

The present non-provisional patent application claims priority from U.S. patent application Ser. No. 18/242,898 filed on Sep. 6, 2023, which is incorporated herein by reference in its entirety and for all purposes as if completely and fully set forth herein.

BACKGROUND OF THE INVENTION

Field of the Invention

This invention relates generally to systems and techniques to determine the proportion of content items used by a generative artificial intelligence (e.g., Latent Diffusion Model or similar) to generate derivative content, thereby enabling attribution (and compensation) to content creators that created the content items used to generate the derivative content.

Description of the Related Art

Generative artificial intelligence (AI) enables anyone (including non-content creators) to instruct the AI to create derivative content that is similar to (e.g., shares one or more characteristics with) (1) content that was used to train the AI, (2) content used by the AI to create the new content, or (3) both. For example, if someone requests that the AI generate an image of a particular animal (e.g., a tiger) in the style of a particular artist (e.g., Picasso), then the AI may generate derivative content based on (1) drawings and/or photographs of the particular animal and (2) drawings of the particular artist. Currently, there is no means of determining the proportionality of the content that the AI used to generate the derivative content and therefore no mechanism to provide attribution (and compensation) to the content creators that created the content used by the AI to generate the derivative content.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a music-based output produced by a generative artificial intelligence is segmented into multiple segments. An encoder is used to generate multiple output embedding. Individual output embeddings of the multiple output embeddings are derived from individual segments of the multiple segments. A distance measurement between individual output embeddings of the multiple embeddings and individual training segment embeddings of multiple training segment embeddings is determined to create a set of distance measurements. The plurality of distance measurements is correlated to a plurality of content creators that created multiple content items used to train the generative artificial intelligence. One or more creator attributions are determined based at least in part on the correlating. A creator attribution vector that includes the one or more creator attributions is determined and compensation is provided to one or more content creators of the plurality of content creators based on the creator attribution vector.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4 is a block diagram of a system to perform output-based attribution based on creator embeddings, according to some embodiments.

FIG. 5 is a block diagram of a system to perform output-based attribution, according to some embodiments.

FIG. 6 is a flowchart of a process that includes determining a distance measurement between an output embedding and individual creator embeddings, according to some embodiments.

FIG. 7 is a flowchart of a process that includes determining a distance measurement between an output embedding and individual content item embeddings, according to some embodiments.

FIG. 8 is a flowchart of a process that includes determining a distance measurement between an output embedding and content items based on categories (e.g., characteristics), according to some embodiments.

FIG. 11 is a flowchart of a process to perform composition and style attribution of a musical piece (song) to determine attribution, according to some embodiments.

FIG. 12 is a flowchart of a process to perform multi-scale topological analysis of a musical piece (song) to determine attribution, according to some embodiments.

FIG. 13 is a flowchart of a process to perform semantic analysis of a musical piece (song) to determine attribution, according to some embodiments.

DETAILED DESCRIPTION

Figure 1:
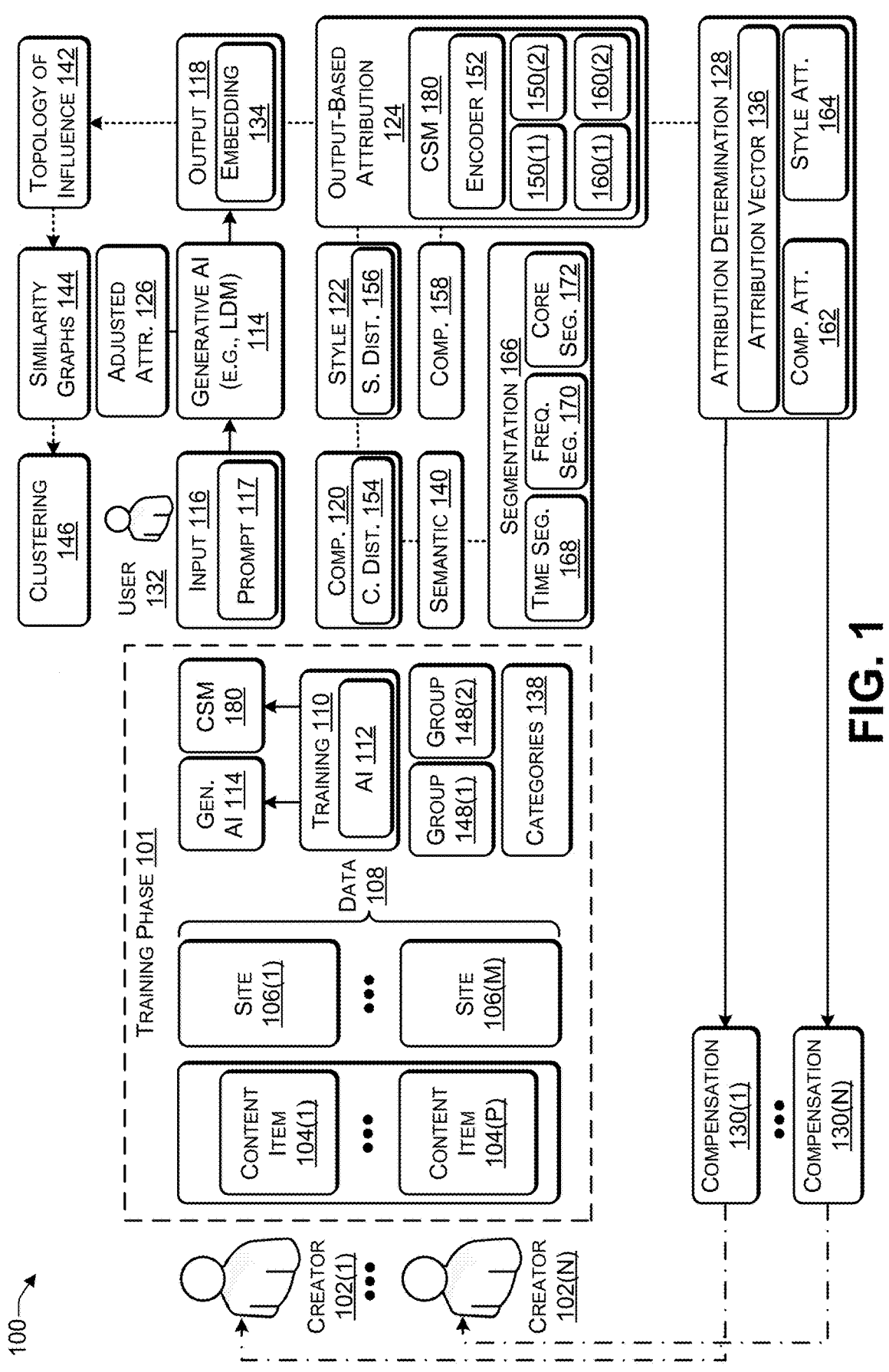
FIG. 1 is a block diagram of a system illustrating different ways to determine attribution of an output produced by a generative artificial intelligence (AI), according to some embodiments.

With conventional art (e.g., paintings), the term provenance refers to authenticating a work of art by establishing the history of ownership. More broadly, provenance is a set of facts that link the work of art to its creator and explicitly describe the work of art including, for example, a title of the work of art, a name of the creator (e.g., artist), a date of creation, medium (e.g., oil, watercolor, or the like), dimensions, and the like. Generative artificial intelligence (AI), implemented using, for example, a diffusion model or similar AI, may be used to generate digital content. For example, a user (e.g., a secondary creator) may input a text description of the desired digital content to the AI and the AI may generate an output. To illustrate, the input "create a painting of a lion in the style of Picasso" may result in the generative AI creating a digital image that is derived from a photograph or painting of a lion and from the paintings of artist Pablo Picasso. The term provenance, as used herein, is with reference to digital content generated by an AI and includes attribution to one or more content creators (e.g., Picasso).

Terminology

Creator refers to a provider of original content ("content provider"), e.g., content used to train (e.g., fine tune or further train) the generative AI to encourage an "opt-in" mentality. By opting in to allow their original content to be used to train and/or re-train the generative AI, each of the creators receive attribution (and possibly compensation) for derivative content created by the generative AI that has been influenced by the original content of the creators.

User (e.g., a secondary creator) refers to an end user of the generative AI that generates derivative content using the generative AI.

Category refers to various characteristics of a content item, either original content or derivative content. For example, categories associated with a work of art may include (1) material applied to a medium, such as pencil (color or monochrome), oil, watercolor, charcoal, mixed materials, or the like, (2) the medium, such as paper, canvas, wood, or the like, (3) the instrument used to apply the material to the medium, such as a brush, a finger, a palette knife, or the like, (4) style, such as renaissance, modern, romanticism, neo-classical, hyper-realism, pop art, or the like, and so on.

Embedding refers to a matrix (or a vector) of numbers. An embedding may be used to describe something in terms of other things. For example, derivative content created by a generative AI may include an output embedding that describes the output in terms of creators, content items, categories (e.g., characteristics), or any combination thereof.

The systems and techniques described herein may be applied to any type of generative AI models, including (but not limited to) diffusion models, generative adversarial network (GAN) models, Generative Pre-Trained Transformer (GPT) models, or other types of generative AI models. For illustration purposes, a diffusion model is used as an example of a generative AI. However, it should be understood that the systems and techniques described herein may be applied to other types of generative AI models. A diffusion model is a generative model used to output (e.g., generate) data similar to the training data used to train the generative model. A diffusion model works by destroying training data through the successive addition of Gaussian noise, and then learns to recover the data by reversing the noise process. After training, the diffusion model may generate data by passing randomly sampled noise through the learned denoising process. In technical terms, a diffusion model is a latent variable model which maps to the latent space using a fixed Markov chain. This chain gradually adds noise to the data in order to obtain the approximate posterior q(x1:T|x0), where x1, . . . , xT are latent variables with the same dimensions as x0.

A latent diffusion model (LDM) is a specific type of diffusion model that uses an auto-encoder to map between image space and latent space. The diffusion model works on the latent space, making it easier to train. The LDM includes (1) an auto-encoder, (2) a U-net with attention, and (3) a Contrastive Language Image Pretraining (CLIP) embeddings generator. The auto-encoder maps between image space and latent space. In terms of image segmentation, attention refers to highlighting relevant activations during training. By doing this, computational resources are not wasted on irrelevant activations, thereby providing the network with better generalization power. In this way, the network is able to pay "attention" to certain parts of the image. A CLIP encoder may be used for a range of visual tasks, including classification, detection, captioning, and image manipulation. A CLIP encoder may capture semantic information about input observations. CLIP is an efficient method of image representation learning that uses natural language supervision. CLIP jointly trains an image encoder and a text encoder to predict the correct pairings of a batch of (image, text) training examples. The trained text encoder synthesizes a zero-shot linear classifier by embedding the names or descriptions of the target dataset's classes. For pre-training, CLIP is trained to predict which possible (image, text) pairings actually occurred. CLIP learns a multi-modal embedding space by jointly training an image encoder and text encoder to maximize the cosine similarity of the image and text embeddings of the real pairs in the batch while minimizing the cosine similarity of the embeddings of the incorrect pairings.

As a first example, a computer-implemented method includes: segmenting, by one or more processors, a music-based output produced by a generative artificial intelligence, into multiple segments. The method includes generating, by an encoder executed by the one or more processors, multiple output embeddings. Individual output embeddings of the multiple output embeddings are derived from individual segments of the multiple segments. The method includes determining, by the one or more processors, a distance measurement between individual output embeddings of the multiple embeddings and individual training segment embeddings of multiple training segment embeddings to create a set of distance measurements. The method includes correlating, by the one or more processors, the plurality of distance measurements to a plurality of content creators that created multiple content items used to train the generative artificial intelligence. The method includes determining, by the one or more processors, one or more creator attributions based at least in part on the correlating. The method includes determining, by the one or more processors, a creator attribution vector that includes the one or more creator attributions. The method includes initiating, by the one or more processors, providing compensation to one or more content creators of the plurality of content creators based on the creator attribution vector. In some cases, segmenting the music-based output produced by the generative artificial intelligence into multiple segments may include performing semantic segmentation of the music-based output into multiple core segments, where the multiple core segments comprise at least two of: an intro, a verse, a pre-chorus, a chorus, a post-chorus, a bridge, a solo, a break, an interlude, or an outro. In some cases, segmenting the music-based output produced by the generative artificial intelligence into multiple segments may include identifying, using multi-pitch melody extraction, one or more musical patterns in the music-based output and determining one or more data abstractions, where individual data abstractions of the one or more data abstractions are abstractions of individual musical patterns of the one or more musical patterns. For example, the individual data abstractions may include musical instrument data interface (MIDI) data. In some cases, segmenting the music-based output produced by the generative artificial intelligence into multiple segments may include segmenting the music-based output into a plurality of stems, identifying one or more melodies in individual stems of the plurality of stem, and identifying one or more melodies in combinations of two or more stems from the plurality of stems, where the plurality of stems comprise at least two of: a vocal stem, a guitar stem, a bass stem, a keyboard stem, or a drum stem.

As a second example, a server include one or more processors and a non-transitory memory device to store instructions executable by the one or more processors to perform various operations comprising. The operations include segmenting a music-based output produced by a generative artificial intelligence, into multiple segments. The operations include generating, by an encoder, multiple output embeddings, where individual output embeddings of the multiple output embeddings are derived from individual segments of the multiple segments. The operations include determining a distance measurement between individual output embeddings of the multiple embeddings and individual training segment embeddings of multiple training segment embeddings to create a set of distance measurements. The operations include correlating the plurality of distance measurements to a plurality of content creators that created multiple content items used to train the generative artificial intelligence. The operations include determining one or more creator attributions based at least in part on the correlating. The operations include determining a creator attribution vector that includes the one or more creator attributions. The operations include initiating providing compensation to one or more content creators of the plurality of content creators based on the creator attribution vector. In some cases, segmenting the music-based output produced by the generative artificial intelligence into multiple segments may include segmenting, using a composition and style artificial intelligence, the music-based output into: composition segments and recording style segments. The composition and style artificial intelligence may include a first output head to identify composition similarities and a second output head to identify recording style similarities. The generative artificial intelligence may include: a latent diffusion model, a generative adversarial network, a generative pre-trained transformer, a variational autoencoder, a multimodal model, or any combination thereof. The operations may include selecting a particular creator of the plurality of content creators, performing, using a neural network, an analysis of a set of music-based content items created by the particular creator, determining, based on the analysis, a plurality of captions describing the set of music-based content items, and creating, based on the plurality of captions, a plurality of content item embeddings, where individual content item embeddings corresponding to individual content items of the set of music-based content items. The distance measurement may include a cosine similarity, a contrastive learning encoding distance, a simple matching coefficient, a Hamming distance, a Jaccard index, an Orchini similarity, a Sorensen-Dice coefficient, a Tanimoto distance, Tucker coefficient of congruence, a Tversky index, or any combination thereof.

As a third example, a non-transitory computer-readable memory device stores instructions executable by one or more processors to perform various operations. The operations include segmenting a music-based output produced by a generative artificial intelligence, into multiple segments and generating, by an encoder, multiple output embeddings, where individual output embeddings of the multiple output embeddings are derived from individual segments of the multiple segments. The operations include determining a distance measurement between individual output embeddings of the multiple embeddings and individual training segment embeddings of multiple training segment embeddings to create a set of distance measurements. The operations include correlating the plurality of distance measurements to a plurality of content creators that created multiple content items used to train the generative artificial intelligence. The operations include determining one or more creator attributions based at least in part on the correlating. The operations include determining a creator attribution vector that includes the one or more creator attributions. The operations include initiating providing compensation to one or more content creators of the plurality of content creators based on the creator attribution vector. In some cases, segmenting the music-based output produced by the generative artificial intelligence, into multiple segments may include segmenting the music-based output into: multiple time segments having different lengths of time and multiple frequency segments using different frequency bands. The multiple time segments of the music-based output may be clustered with multiple time training segments of music-based training data (used to train the generative artificial intelligence) to create a time segment cluster. The multiple frequency segments of the music-based output may be clustered with multiple frequency training segments of the music-based training data (used to train the generative artificial intelligence) to create a frequency segment cluster. In some cases, determining one or more creator attributions based at least in part on the correlating may include determining the one or more creator attributions based at least in part on: the correlating, the time segment cluster, and the frequency segment cluster. The operations may include creating a time similarity graph of the multiple time segments of the music-based output and multiple time training segments of music-based training data used to train the generative artificial intelligence. The operations include creating a frequency similarity graph of the multiple frequency segments of the music-based output and multiple frequency training segments of the music-based training data used to train the generative artificial intelligence. In some cases, determining one or more creator attributions based at least in part on the correlating may include determining the one or more creator attributions based at least in part on: the correlating, the time similarity graph, and the frequency similarity graph. The music-based output may include a digital music composition and the one or more creators may include one or more musicians, one or more songwriters, or any combination thereof.

FIG. 1 is a block diagram of a system 100 illustrating different ways to determine attribution of an output produced by a generative artificial intelligence (AI), according to some embodiments. Before a generative AI is deployed, the generative AI undergoes a training phase 101 in which the generative AI is trained to produce a particular type of content. Typically, a generative AI comes pre-trained and then may undergoes further training with a particular type of content (e.g., digital image, music, text-based fiction book, or the like) to enable the generative AI to generate the particular type of content.

Multiple creators 102(1) to 102(N) (N>0) may create content items 104(1) to 104(P) (P>0). The content items 104 may include, for example, digital artwork (including original digital artwork and original artwork that has been digitized), digital images (e.g., photographs), digital music, digital text-based content (e.g., eBooks), digital video, another type of digital content, or any combination thereof. In some cases, at least a portion of the content items 104 may be accessible via one or more sites 106(1) to 106(M) (M>0). For example, the creators 102 may upload one or more of the content items 104 to one or more of the sites 106 to make the content items 104 available for acquisition (e.g., purchase, lease, or the like). The content items 104 may be copied (e.g., via a web crawler or the like) from the sites 106 or links obtained and used as training data 108 to perform training 110 of a generative artificial intelligence 112 to create a generative AI 114 (e.g., trained). The generative AI 114 may be a latent diffusion model or another type of generative AI. A generative AI, such as the AI 112, typically comes pre-trained (e.g., using open-source data), after which further training (the training 110) is performed to create the generative AI 114. For example, when the training 110 uses data 108 that includes images of paintings, then the pre-trained AI 112 may be trained to generate images of paintings, when the training 110 uses rhythm and blues songs, then the pre-trained AI 112 may be trained to create the AI 114 that generates rhythm and blues songs, when the training 110 uses science fiction novels, then the pre-trained AI 112 may be trained to create the AI 114 that generates science fiction novels, and so on. To illustrate, the AI 112 may be a pre-trained model $SD_{BASE}$, such as LAION (Large-scale Artificial Intelligence Open Network or another generative AI model) that is trained using open-source datasets. Using the content items 104, the model $SD_{BASE}$ is tuned to create the generative AI 114, e.g., $SD_{TUNED}$. For example, the generative AI 114 may be tuned to generate a particular type of derivative content, such as, for example, digital images of artwork, digital images of photos, digital music in a particular style, or the like. During the training phase 101, categories 138 associated with the training data 108 (e.g., the content items 104) may be identified. For example, for artwork, the categories 138 may identify the main colors (e.g., red, blue, green, and the like) present in the training data 108, the high-level content (e.g., portrait, landscape, or the like) present in the training data 108, the content details (e.g., human, animal, furniture, jewelry, waterfall, river, ocean, mountain(s), or the like) present in the training data 108, the style (renaissance, modern, romanticism, neo-classical, hyper-realism, pop art, or the like) in the training data 108, and so on.

After the generative AI 114 has been created via the training 110, a user, such as a representative user 132 (e.g., a secondary creator), may use the generative AI 114 to generate derivative content, such as output 118. For example, the representative user 132 may provide input 116, such as input, e.g., "create <content type><content description> similar to <creator identifier>". In this example, <content type> may include digital art, digital music, digital text, digital video, another type of content, or any combination thereof. The <content description> may include, for example, "a portrait of a woman with a pearl necklace", "a rhythm and blues song", "a science fiction novel", "an action movie", another type of content description, or any combination thereof. The <creator identifier> may include, for example, "Vermeer" (e.g., for digital art), "Aretha Franklin" (e.g., for digital music), "Isaac Asimov" (e.g., for science fiction novel), "James Cameron" (e.g., for action movie), or the like. The input 116 may be text-based input, one or more images (e.g., drawings, photos, or other types of images), or input provided using one or more user-selectable settings.

Based on the input 116, the generative AI 114 may produce the output 118. For example, the output 118 may include digital art that includes a portrait of a woman with a pearl necklace in the style of Vermeer, digital music that includes a rhythm and blues song in the style of Aretha Franklin, a digital book that includes a science fiction novel in the style of Isaac Asimov, a digital video that includes an action movie in the style of James Cameron, and so on. The input 116 may be converted into an embedding to enable the generative AI 114 to understand and process the input 116.

Output-based attribution 124 involves analyzing the output 118 to determine the main X (X>0) influences that went into the output 118. Adjusted attribution 126 involves manual fine tuning of the generative process by specifying a desired degree of influence for each content item, creator, pool, category (e.g., the data 108) that the generative AI 114 was trained on. Adjusted attribution 126 enables the user 132 to adjust the output 118 by modifying an amount of influence provided by individual content item, creators, categories, and the like. For example, adjusted attribution 126 enables the user 132 to increase the influence of creator 102(N), which causes the generative AI 114 to generate the output 118 that includes content with a greater amount of content associated with creator 102(N).

The output-based attribution 124 is used by an attribution determination module 128 to determine an attribution for the content creators 102 that influenced the output 118. In some cases, the attribution determination 128 may use a threshold to determine how many of the creators 102 are to be attributed. For example, the attribution determination 128 may use the top X (X>0), such as the top five, top 8, top 10, or the like influences, to determine which of the creators 102 influenced the output 118 and are to be attributed. As another example, the attribution determination 128 may identify one or more of the creators 102 that contributed at least a threshold amount, e.g., Y %, such as 5%, 10%, or the like. In this way, if the influence of a particular creator 102 is relatively small (e.g., less than a threshold amount), then the particular creator 102 may not receive attribution. The attribution determination module 128 may determine attribution that is used to provide compensation 130 to one or more of the creators 102. For example, attribution determination module 128 may determine that a first creator 102 is to be attributed 40%, a second creator 102 is to be attributed 30%, a third creator 102 is to be attributed 20%, and a fourth creator is to be attributed 10%. The compensation 130 provided to one or more of the creators 102 may be based on the attribution determination. For example, the compensation 130(1) to 130(N) may include providing a statement accompanying the output 118 identifying the attribution ("this drawing is influenced by Vermeer", "this song is influenced by Aretha", "this novel is influenced by Asimov", and so on), compensation (e.g., monetary or another type of compensation), or another method of compensating a portion of the creators 102(1) to 102(N), respectively, whose content items 104 were used to generate the output 118.

The generative AI 114 may be trained using images of a particular person (or a particular object) and used to create new images of that particular person (or particular object) in contexts different from the training images. The generative AI 114 may apply multiple characteristics (e.g., patterns, textures, composition, color-palette, and the like) of multiple style images to create the output 118. The generative AI 114 may apply a style that is comprehensive and includes, for example, categories (e.g., characteristics) such as patterns, textures, composition, color-palette, along with an artistic expression (e.g., of one or more of the creators 102) and intended message/mood (as specified in the input 116) of multiple style images (from the training data 108) onto a single content image (e.g., the output 118). Application of a style learned using private content (e.g., provided by the user 132) may be expressed in the output 118 based on the text included in the input 116. In some cases, the output 118 may include captions that are automatically generated by the generative AI 114 using a machine learning model, such as Contrastive Language-Image Pre-Training (CLIP), if human-written captions are unavailable. In some cases, the user 132 (e.g., secondary creator) may instruct the generative AI 114 to produce a 'background' of an image based on a comprehensive machine-learning-based understanding of the background of multiple training images to enable the background to be set to a transparent layer or to a user-selected color. The generative AI 114 may be periodically retrained to add new creators, to add new content items of creators previously used to train the generative AI 114, and so on.

The output 118 may include an embedding 134 (created using an encoder, such as a transformer). The embedding 134 may be a set of numbers, arranged in the form of a matrix (or a one-dimensional matrix, which is sometimes referred to as a vector). Each component of the vector (or matrix) may identify a particular category (e.g., characteristic) expressed in the input 116. To illustrate, a first component of the vector may specify a content type (e.g., digital image, digital music, digital book, or the like), a second component may specify a creator style (e.g., Picasso, Rembrandt, Vermeer, or the like), a third component may specify a painting style (e.g., impressionist, realist, or the like), a fourth component specify a component of the output (e.g., man, woman, type of animal, or the like), and so on. The output 118 may be relatively high resolution. For example, for digital audio, the resolution may be 16 bit or 24 bit sampling at 44 Kilohertz (kHz), 96 kHz, or 192 kHz sampling rate, digital stream direct (DSD) at 2.8224 Mega-Hertz (MHz), or higher. As a further example, for digital video, the resolution may be 1080p (1 k), 4 k, 8 k, or higher. As another example, for digital images, the resolution may be 512 pixels (px), 768 px, 2048 px, 3072 px, or higher and may be square or non-square (e.g., rectangular). To illustrate, the user 132 may specify in the input 116 as a ratio of the length to width of the output 118, such as 3:2, 4:3, 16:9, or the like, the resolution (e.g., in pixels) and other output-related specifications. In some cases, the output 118 may apply a style to videos with localized synthesis restrictions using a prior learned or explicitly supplied style.

The output-based attribution 124 creates an output-based attribution vector 136, e.g., for style transfer synthesis and for using the content (e.g., composition) and style to adjust the attribution vector, e.g., by increasing the element in the attribution vector corresponding to the creator 102 who created the style images. The degree of influence for the generative AI 114 may also be manually adjusted, as described herein, using the adjusted attribution 126. The embedding 134 may include information identifying (1) one of more of the content creators 102 whose content items 104 are included in the output 118, (2) one or more of the content items 104 included in the output 118, (3) one or more of the categories 138 included in the output 118, or (4) any combination thereof. The output-based attribution 124 may use the embedding 134 to create the attribution vector 136.

Output-based attribution 124 may be performed (i) by comparing creator embeddings of individual creators 102 to the embedding 134 (e.g., where the embedding 134 identifies individual creators 102 used to create the output 118) to determine the attribution vector 136, (ii) by comparing embeddings of the content items 104 with the embedding 134 (e.g., where the embedding 134 identifies individual content items 104 used to create the output 118) to determine the attribution vector 136, (iii) by comparing content embeddings of characteristics of the content items 104 with the embedding 134 (e.g., where the embedding 134 identifies characteristics of individual creators 102 used to create the output 118) to determine the attribution vector 136, or (iv) any combination thereof. For example, the embedding 134 may identify: (i) the individual creators 102 whose content items were used to create the output 118, (ii) the content items 104 used to create the output 118, (iii) categories (e.g., characteristics), or (iv) any combination thereof.

In the following, we discuss additional details of how attribution for output 118 generated by AI 114 can be derived from the output 118 using three different types of analysis ((i) composition-style, (ii) segmentation, (iii) semantic analysis) that can be used individually or in combination. First, the output 118 may be analyzed to differentiate the attribution to a composition and attribution to a style associated with the original training songs (training data 108). Second, output-based attribution 124 may be refined by analyzing the output 118 by segmenting the output 118 using different time segments and different frequency bands. Third, semantic analysis of the output 118 may be used to determine attribution. Semantic analysis may include using MIDI representations, melody extraction, and semantic segmentation to further identify where the output 118 was influenced by the training data 108 and in what way the output 118 was influenced.

Composition Attribution and Recording Style Attribution

Music pieces (songs) have two inherent rights associated with them: the rights to (1) the composition of the piece, e.g., melody, chord arrangement, and the like and (2) the specific recording of the composition, e.g., the instruments used, the effects (e.g., reverb, and the like) that are applied, and other stylistic choices made by the recording artist and/or recording engineer. Differentiating between these two (composition and specific recording) is critical for output-based attribution 124 when analyzing music-based output 118. For output 118 that includes musical content ("music"), the output-based attribution 124 may determine composition data 120 and recording style ("style") data 122 from the output 118. The composition data 120 and style data 122 are extracted from the embedding 134 generated from the output 118 of the AI 114.

To extract the composition data 120 and style data 122, the output-based attribution 124 may include a composition and style AI model (CSM) 180 (e.g., an artificial neural network, a regression, or another type of AI capable of to extracting high-level features from a matrix input). The CSM 180 may be trained (during training 110) using data that includes songs in at least two groups 148(1) and 148(2). For example, when the content items 104 are musical pieces, the musical pieces may be grouped into the groups 148(1) and 148(2). Group 148(1) includes songs that share a similar (or identical) composition but may feature different recording styles. For example, group 148(1) may include covers of famous songs or augmented versions of songs where elements (e.g., pitch, key, post-processing filters, or the like) were changed from the original recording. Group 148(1) may be referred to as composition songs. Group 148(2) includes songs with the same recording style, but with different compositions, such as songs from a single album of a band or a singer, where the same (or similar) instruments, vocalists, and effects are used for all songs, even though melodies are different across all tracks. Group 148(2) may be referred to as style songs.

The CSM 180 is trained using sets of two or more embeddings of the songs, from the same group, e.g., each set includes multiple composition songs (two or more songs from 148(1)) or two or more style songs (two or more songs from 148(2)). The CSM 180 is trained to create high-level embeddings of the song embeddings that are as similar to each other as possible. In this way, two or more composition songs are embedded in the same way regardless of the differences in recording style and two or more style songs are embedded the same way regardless of their differing compositions. To achieve this, the CSM 180 creates a high-level embedding of each training song in each set of training songs. Then, the difference between the embeddings of the two or more songs from the same group is used as the training loss. During training 110, the training loss is minimized, enabling the CSM 180 to extract similar (almost identical) embeddings from songs with identical composition and to extract similar (almost identical) embeddings for songs with the same style. For example, the training loss may be minimized using contrastive learning, where an additional song that is from a different composition or recording is also embedded. In this example, the loss comprises the similarity of the two or more songs from the same group combined with the dissimilarity of the two or more songs to the third song that is different. The two or more similar songs have embeddings that are very similar and very dissimilar from the additional song.

In some cases, the CSM 180 may be implemented with two output heads 150(1) and 150(2), one for composition and one for style, respectively. The heads 150 of a neural network refer to the last layer(s) where the features extracted in the main body of the AI (CSM 180) are used for a specific task. For example, an AI model, such as Contrastive Language-Audio Pretraining (CLAP), can extract generic features, which can then be fed into multiple separate, smaller networks which are called the heads. Here, the output of these heads 150 is the specialized value(s) being determined, such as compositional attribution 162 and stylistic attribution 164. Heads whose output is used for specific types of attribution are referred to as "output heads", to distinguish from the output of the underlying feature extractor, CLAP. The CSM 180 includes a shared encoder 152 that extracts initial information from the song/song embedding 134. After the initial information is extracted, the composition head 150(1) generates embeddings that are nearly identical, for any two composition songs (from group 148(1)) that have a similar composition while the recording head 150(2) generates embeddings that are nearly identical for any two style songs (from group 148(2)) that have similar styles.

The CSM 180 may be used to derive the attribution vector 136 from the output 118 by feeding the output 118 into the dual heads 150 of the CSM 180. The composition output of head 150(1) is compared, using a comparator 158, to the composition output of every training song (in groups 148). The style output of head 150(2) is compared, using the comparator 158, to the style output of every training song (in groups 148). A similarity measure (e.g., cosine similarity, Euclidean Distance, Jaccard similarity, or another type of similarity measurement) is used to determine a composition distance 154 and a style distance 156 for the generated output 118. The two distances 154, 156 are used to derive composition attribution 162 and style attribution 164 by the attribution determination module 128 to determine the compensation 130 for both composition and style for the creators 102 that created the training items 104 (that are grouped into groups 148).

In some cases, instead of (or in addition to) using the dual-headed contrastive CSM 180, another approach is to train a first autoencoder 160(1) that takes one composition song as input (during training) and is trained with a second composition song as a target. By training the AI 112 to reconstruct a different rendition of the same composition from the input, the CSM 180 learns to extract the information relevant to the composition. A second autoencoder 160(2) is trained with style songs, learning to extract the information relevant to the style of the songs. After training the two autoencoders 160(1), 160(2), each training song may be run through both autoencoders 160(1), 160(2) of the CSM 180 and the bottleneck layer of each autoencoder may be stored as a high-level representation of the composition data and style data of each song. During inference (e.g., generating the output 118 based on the input 116), the output 118 generated by the AI 114 is fed into both autoencoders 160(1), 160(2) and the resulting bottleneck layer outputs are used as the composition data and the style data of the output 118. The two bottleneck outputs are compared, using a comparator 158, to the respective bottleneck outputs of the training corpus (items 104 in groups 148), yielding a composition similarity measure and a style similarity measure which may be used to derive composition attribution 162 and style attribution 164 to each individual training song.

Multi-Scale Topological Analysis

Regardless of the type of attribution that the output-based attribution 124 determines (e.g., overall attribution, composition attribution, style attribution), the attribution determination module 128 may analyze the output 118 using multiple scales and a topology of influence 142. Musical attribution may be evident across the entire song to a large amount or musical attribution may be present in low amounts and/or in some segments of the output 118. Attribution is not a discrete, binary number, but varies for different portions of the output 118 (e.g., image, text, song or the like). If the output 118 blatantly copies an existing song, the attribution to that song might be 95% throughout the entire duration of the output 118. However, in some cases, the output 118 might use a small part of the guitar riff of the intro, a small vocal hook of the verse, and a piano sequence in the chorus. In such cases (subtler), the attribution might not exceed 30% of any individual segment (intro, verse, chorus etc.) of the song, and may be limited to just one stem at a time. However, these more subtle influences can still add up to the output 118 effectively copying from different portions of an original song. When the output 118 is fed back into (provided as input 116 to) the AI 114 again to create a second output based on the first output 118, the system 100 may keep track of attribution across multiple generations by maintaining a multi-scale topological attribution record across one or more generations based on the output 118.

Each song (both in the training data and in the output 118) may be divided by a segmentation module 166 into multiple time segments 168 of different lengths (e.g., X seconds, X>0, such as 15, 30, 60, 90 seconds) and multiple frequency segments 170 using different frequency bands (e.g., 20-100 Hertz (Hz), 101-500 Hz, 501-1000 Hz, 1001-4000 Hz, 4001-15,000 Hz) to create multiple bands with multiple lengths. The attribution techniques described herein may be applied at multiple temporal and multiple spectral levels to create multi-scale embeddings. The multi-scale embeddings may be used to build a similarity graph 144 for segments 168, 170 of the output 118 along with the multi-scale embeddings of the training data (items 104). Even if the output 118 does not have any obvious influences, this approach identifies weak influences and similarities to the training corpus (items 104). The similarity graph 144 may be maintained across multiple generations, e.g., output 1 is generated, output 2 is generated based on output 1, output 3 is generated based on output 2, and so on. In this way, similarities and influences are tracked across multiple outputs. If a new output is based on a previous AI-generated output, the system 100 can keep track of influences (attribution) across multiple generations. If a particular influence becomes stronger with each generation, this particular influence is identified and kept track of. Clustering 146 of the resulting similarity graph 144 enables this process to remain computationally feasible and enables similarities to be detected among multiple time segments 168 and multiple frequency segments 170, regardless of which time or frequency spectrum they are from. The amount of clusters in the clustering 146 may be used to further quantify attribution. For example, if the output 118 shows similarity to the training data 108 in multiple scales and in multiple segments, the attribution may be higher than if a similarity of the same strength is found only in one segment. For example, assume the output 118 (AI generated song) is influenced by the guitar track of an existing song. The system 100 may assess the similarity on many levels, e.g., "Is the overall melody the same/similar?" "Is the bass line of the guitar part the same/similar?" "Are the high-pitched notes the same/similar?" "Is it similar in one segment?" "Similar in multiple segments?" "Similar throughout the entire track?" and so on. The more often the answer to such questions is "yes", the higher the absolute attribution value, even if the similarity is 10% or less for each question. These questions can be computed as similarity graph clusters across different spectral and temporal scales—the more scales/frequencies/time steps a similarity is detected at, the higher the attribution. Thus, the multi-scale approach detects influences in multiple time segments 168 and/or multiple frequency segments 170, down to a granularity of time segments comprising a few seconds and/or frequency segments of a few Hertz.

Semantic Analysis

In some cases, the system 100 may use a more holistic approach that uses semantic analysis 140 that treats the song (output 118) as multiple semantically meaningful components rather than individual time segments 168 and frequency segments 170. The semantic analysis 140 can be viewed as a top-down approach as compared to the segment analysis, which is a bottom-up approach. In semantic analysis 140, instead of analyzing small segments (segmented by time and/or frequency band) and aggregating the influences using the similarity graph 144 and clustering 146, the song (output 118) is analyzed as a whole and broken down into larger, more meaningful segments 168, 170, and, in some cases, reaching the granularity of the graph-based approach.

The semantic analysis (module) 140 performs semantic segmentation to identify core segments 172 of the song (output 118), such as choruses, verses, bridges, and the like. The attribution determination 128 applies the attribution techniques described herein to the core segments 172, identifying which elements of the AI-generated song (output 118) are influenced by the training data 108 and by how much. The semantic analysis 140 identifies consistent musical patterns throughout a song (output 118), including multi-pitch melody extraction. A melody may be included throughout the whole song or may only appear in portions of the song. The semantic analysis 140 identifies the presence of a melody regardless of how often or how consistently it appears. For example, the melody is recognized even when it is transposed to a different key (frequency). The melody may be extracted using signal processing techniques such as f0 (fundamental frequency) extraction, or using a deep-learning AI trained to extract melodies from songs. The melodies may be quantified as half-step difference sequences together with the time steps at which a note changes, combined with variable information such as the key and pitch in which the melody was recorded. The melodies (in the core segments 172) identified in the output 118 may be compared to the melodies identified in the training data 108, either directly by determining a similarity measure (such as cosine similarity), or by embedding the melodies using an encoder as described herein and comparing the embeddings. The melody extraction (part of semantic analysis 140) may be refined by first splitting the song into stems (e.g., vocals, guitar, piano, bass, keyboards, and the like) of the song and then identifying melodies across individual stems and/or combination of stems. Thus, the semantic analysis 140 may determine how a particular stem of the output 118 is influenced by one or more stems in the original training data 108.

The melody extraction may be further abstracted from individual instruments by extracting the underlying musical instrument digital interface (MIDI) description of the output. MIDI is a technical standard that describes a communication protocol, digital interface, and electrical connectors that connect a wide variety of electronic musical instruments, computers, and related audio devices for playing, editing, and recording music. MIDI data abstracts a performance by digitally encoding performance information, such as note on, note off, note duration, pitch bend, sustain pedal, key pressure, and the like. The MIDI data is instrument agnostic and can be used to trigger any MIDI instrument. The MIDI data may be extracted either via signal processing such as f0 extraction, or by using deep-learning techniques trained in a supervised way with songs and their corresponding MIDI annotations. The MIDI descriptions extracted from the output 118 (song) may be compared either directly to the MIDI data of the training data 108, or by embedding the MIDI data with an encoder and comparing the MIDI embedding of the output 118 to MIDI embeddings of the training data 108. Semantic similarities can be combined to allow both an overall quantification of attribution as well as a detailed report of how each segment, each melody, and each instrument heard in the output 118 (song) was influenced by the melodies and instruments in the training data 108.

Thus, an AI may be trained using content to create a generative AI capable of generating derivative content based on the training content. The user (e.g., derivative content creator) may provide input, in the form of a description describing the desired output, to the generative AI. The generative AI may use the input to generate an output that includes derivative content derived from the training content. When using output-based attribution, the output may be analyzed to identify the influence of one or more original content creators. An attribution determination module may use the output-based attribution to determine an attribution vector that indicates an amount of attribution for individual creators. For example, the attribution determination module may determine a distance measurement (also referred to as similarity or proximity) between an embedding associated with the output (produced by the generative AI) and (i) creator embeddings of individual creators, (ii) content embeddings of content items, (iii) content item embeddings of characteristics of content items, or (iv) any combination thereof. The distance (e.g., proximity) measurement may be used to determine the creator attribution.

Figure 2:
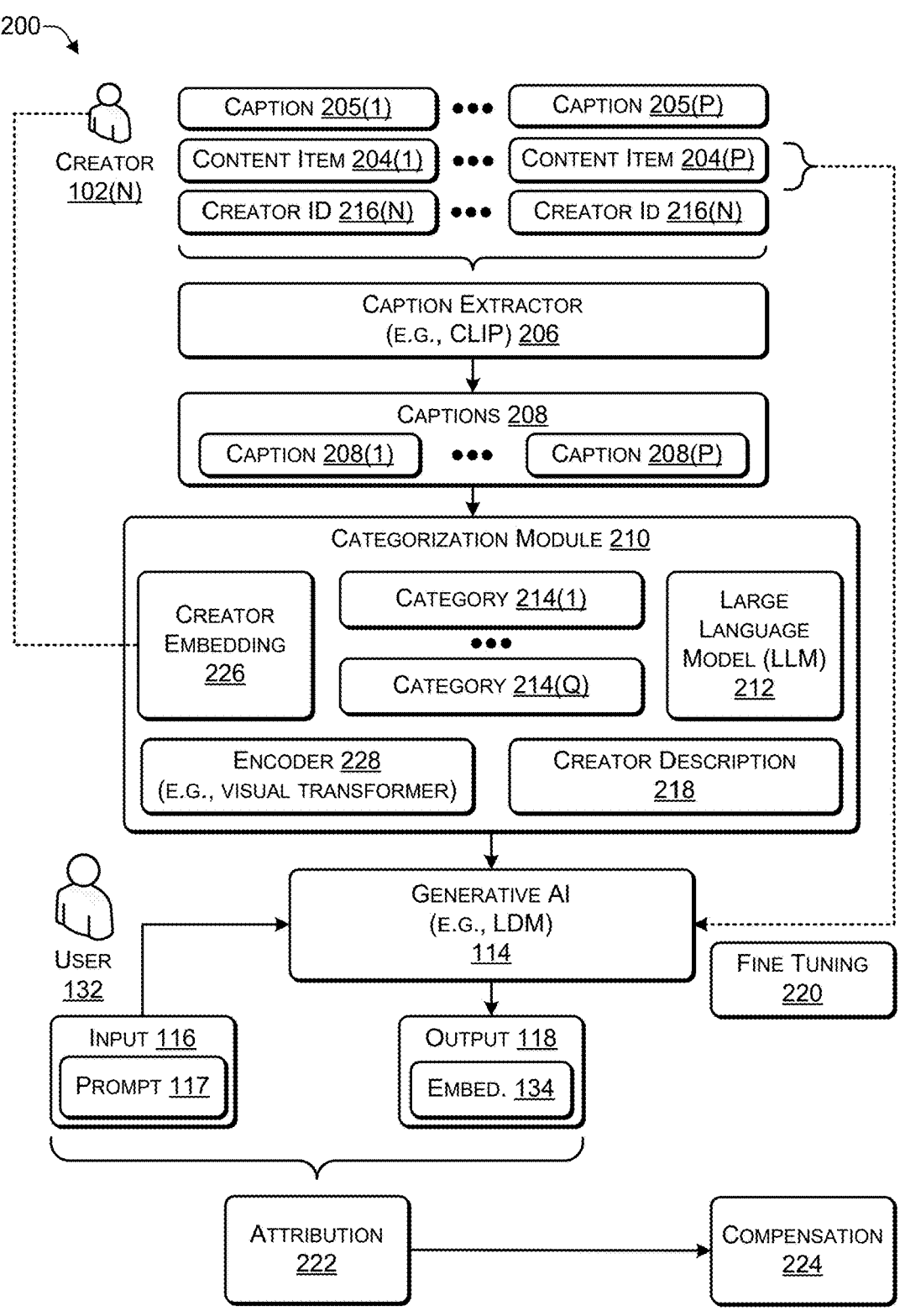
FIG. 2 is a block diagram of a system to train an artificial intelligence (AI) on a particular content creator, according to some embodiments.

FIG. 2 is a block diagram of a system 200 to train an artificial intelligence (AI) on a particular content creator, according to some embodiments. A creator 102(N) (N>0) may create one or more content items 204(1) to 204(P) (P>0) (e.g., a portion of the content items 104 of FIG. 1). The system 200 may be used to train the generative AI 114 to add (e.g., learn) the content items 204 associated with the creator 102(N). The system 200 may be used to train the generative AI 114 to add (learn) a new creator (e.g., content items 204 of the creator 102(N) were not previously used to train the generative AI 114) or add additional content items created by a creator. For example, assume the creator 102(N) creates a first set of content items during a first time period (e.g., Y years, Y>0). The generative AI 114 is trained using the first set of content items to add the creator 102(N). Subsequently, the creator 102(N) creates a second set of content items. The generative AI 114 may be trained using the second set of content items to update the knowledge associated with the creator 102(N).

In some cases, the content items 204 may have associated captions 205 that describe individual content items. For example, caption 205(1) may be a caption that describes the content item 204(1) and caption 205(P) may be a caption that describes the content item 204(P). If one or more of the content items 204 do not have an associated caption 205 or to supplement the caption 205, a caption extractor 206 may be used to create captions 208, where caption 208(1) describes content item 204(1) and caption 208(P) describes content item 204(P). The caption extractor 206 may be implemented using, for example, a neural network (or another type of AI) such as Contrastive Language Image Pre-training (CLIP), which efficiently learns visual concepts from natural language supervision. CLIP may be applied to visual classification, such as art, images (e.g., photos), video, or the like. The captions 208 produced by the caption extractor 206 may be text-based. In some cases, such as with audio, text, or both, the caption extractor 206 may be implemented using a neural network (or another type of AI), such as Contrastive Language-Audio Pretraining (CLAP) or similar.

A unique identifier (id) 216 may be assigned to each content item 204 associated with individual creators. A unique id 216(N) may be associated with each of the content items 204 associated with the creator 102(N). For example, the unique id 216(N) may be associated with each of the content items 204 using Dreambooth (a deep learning generative model used to fine-tune text-to-image models). The caption extractor 206 may be used to create a caption 208 for each content item 204 if one or more if the content items 204 do not have an associated caption 205 or to supplement the caption 205.

The categorization module 210 is used to identify categories 214(1) to 214(Q) based on the captions 205, 208 associated with each content item. For example, a visual image of a dog and a cat on a sofa may result in the captions "dog", "cat", "sofa". The categorization module 210 may use a large language model 212 to categorize the captions 208. For example, dog and cat may be placed in an animal category 214 and sofa may be placed in a furniture category 214. In this way, the categorization module 210 may create a creator description 218 associated with the unique identifier 216. The creator description 218 may describe the type of content items 204 produced by the creator 102(N). For example, the categorization module 210 may determine that the creator 102(N) creates images (e.g., photos or artwork) that include animals and furniture and indicate this information in the creator description 218.

For example, the creator embedding 226 may be viewed as an embedding point $E_{Ai}$ that represents the content items 204 created by artist $A_i$ (e.g., creator 102(N)) and what the generative AP 114 learns from the captions 208. The creator embedding 226 is created using an encoder 228 using an encoding technique, such as a visual transformers, denoted ViT. The generative AI 114 (e.g., $SD_{TUNED}$) may generate output 118 (e.g., an image $I_p$) based on prompt 117 (e.g., prompt p) provided by the user 132. To determine the attribution 222, the distance (e.g., distance $d_1$) of the embedding 134 (e.g., embedding $E_{Ip}$ of the image $I_p$) to the creator embedding 226 (e.g., $E_{A1}$).

The generative AI 114 may use the prompt 117 to produce the output 118. The output 118 may be compared with the creator embedding 226, the categories 214 associated with the creator 102(N), the content items 204, or any combination thereof. In some cases, fine tuning 220 may be performed to further improve the output of the generated AI 114 to enable the output 118 to closely resemble one or more of the content items 204. An attribution module 222, such as the output-based attribution 124, may be used to determine the attribution and provide compensation 224 to the creator 102(N).

Thus, an AI may be trained on a particular creator by taking content items created by the particular creator, analyzing the content items to extract captions, and using a categorization module to categorize the captions into multiple categories, using a large language model. The particular creator may be assigned a unique creator identifier and the unique creator identifier may be associated with individual content items associated with the particular creator. The output of the generative AI may be fine-tuned to enable the generative AI to produce output that more closely resembles (e.g., has a greater proximity to) the content items produced by the particular creator.

Figure 3:
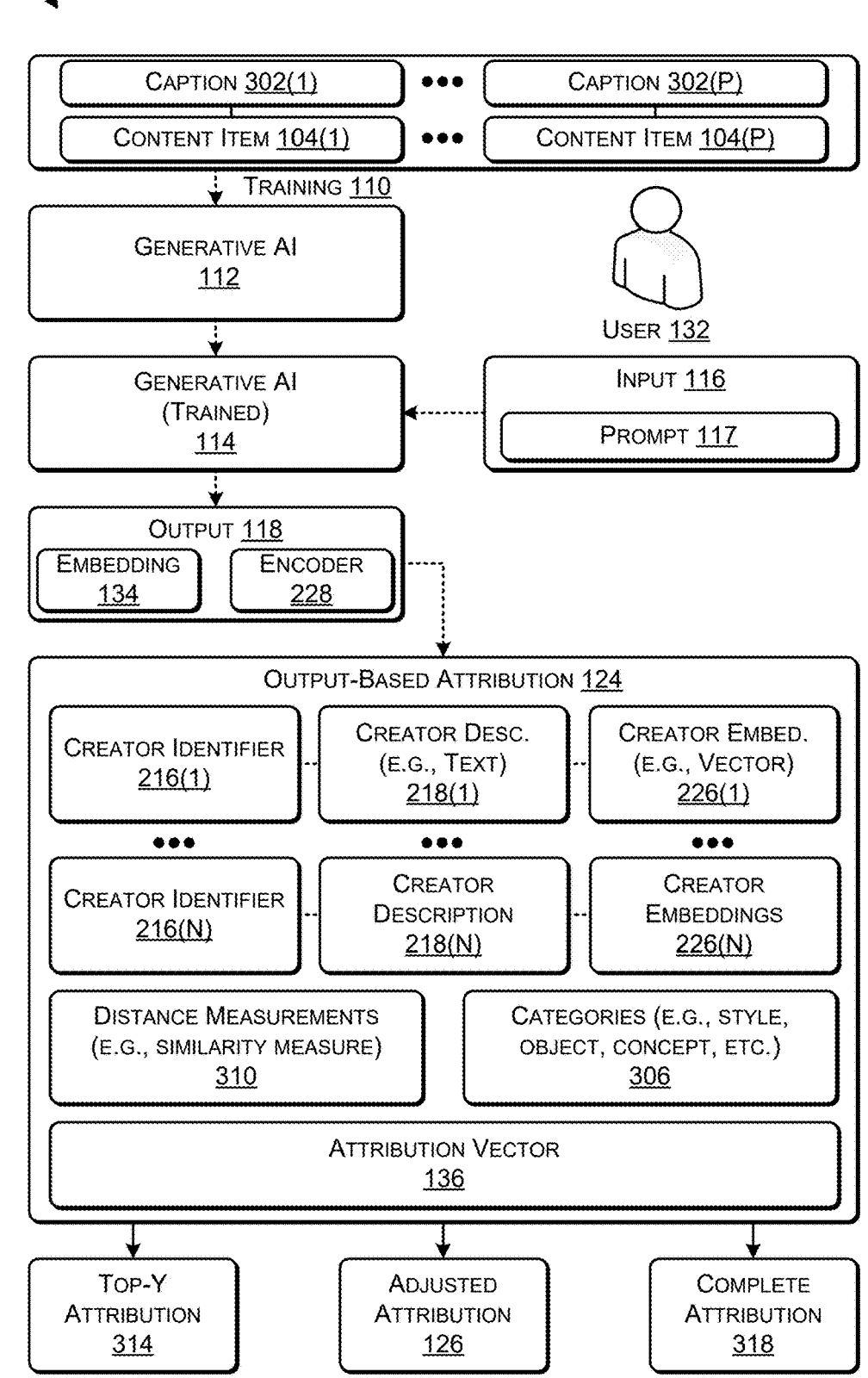
FIG. 3 is a block diagram of a system to create an attribution vector, according to some embodiments.

FIG. 3 is a block diagram of a system 300 to create an attribution vector, according to some embodiments. The output-based attribution 124 may create the attribution vector 136 based on the output 118 (e.g., derivative content) that was generated in response to the user 132 providing the input 116. The attribution vector 136 specifies an amount (e.g., a percentage or another type of measurement) of influence each content item, creator, pool, category, and the like has on the output 118. Output-based attribution 124 may be performed using one or more of the following techniques: (1) creator-based attribution that determines the creators that have influenced the output 118, (2) content-based attribution that determines the content items (and associated content creators) that have influenced the output 118, (3) category-based (e.g., characteristics-based) attribution that determines categories embedded in the output 118 and identifies the content creators associated with the categories, or (4) any combination thereof.

Each content item 104 may have an associated caption. For example, content item 104(1) may have an associated caption 302(1) and content item 104(P) may have an associated caption 302(P). Each of the captions 302(1) to (P) may include (i) the associated caption 205 (e.g., description) provided by the creator 102 that created the content item 104, (ii) the caption 208 created by the caption extractor 206 of FIG. 2, or both.

The output-based attribution 124 determines an output-based attribution vector 136 for the output 118. The attribution vector 136 specifies a percentage of influence that each image, creator, pool, category, or the like had in the creation of the output 118 created by the generative AI 114 based on the input 116.

Each of the creators 102(1) to 102(N) of FIG. 1 may have an associated creator identifier 216(1) to 216(N), a text-based creator description 218(1) to 218(N), and a vector-based (or matrix-based) creator embedding 226(1) to 226(N). In some cases, the output-based attribution 124 may determine categories 306 (e.g., characteristics) associated with the training data 108 and analyze the embedding 134 to identify which of the categories 306 are present. The output-based attribution 124 may determine distance measurements 310 between the embedding 134 and the categories 306, between the embedding 134 and the individual creator embeddings 226, or both. There are several types of creator-based attribution that may be determined: Top-Y attribution 314, adjusted attribution 126, complete attribution 318, or any combination thereof.

For top-Y attribution 314, the output-based attribution 124 determines an influence of the top Y (Y>0) contributors (content creators) to the output 118. In some cases, the top Y may be a predetermined number, such as top 5, top 10, or the like. In other cases, the top Y may be contributors (content creators) whose influence is greater than a threshold amount (e.g., 10%, 5%, or the like). Note that when Y=1, single-creator attribution is determined, e.g., the output-based attribution 124 determines the influence of a single content creator on the output 118, e.g., the creator with the greatest influence on the output 118.

Adjusted attribution 126 determines the influence of a set of content creators on the output 118 after the user 132 has finished adjusting the influence to create the output 118. For example, the user 132 may select a set of content creators (creators 102 of FIG. 1) and then "mix" (e.g., adjust) substantially in real-time, the influence of individual content creators in the set of content creators, and views the resulting output (substantially in real-time) until the output 118 satisfies the user 132. To illustrate, the user 132 may select a set of creators (e.g., Aretha Franklin, Etta James, and Ella Fitzgerald) and adjust, substantially in real-time, an amount of influence of each creator on the resulting output 118 until the user 132 is satisfied with the output 118. The adjusted attribution 126 may determine individual percentages of influence associated with each of the selected creators, with each percentage ranging from 0% to 100%.

For complete attribution 318, the output-based attribution 124 determines an influence of content items 104 used in the training data 108 (of FIG. 1) on the output 118. For example, the AI 112 may be pre-trained using open-source datasets. The AI 112 is then fine-tuned using the content items 104 associated with the creators 102 to create the generative AI 114. If the content items 104 have captions describing them, then a unique creator identifier 216 may be added to each caption to identify the creator 102 of each content item 104. In some cases, a caption generated using CLIP may be added. The unique identifier may result in creator embeddings 226 $E_{Ai}$, which represents what the AI 114 knows about each creator $A_i$ on top of what the AI 114 already knows from the captions associated with the content items 104. The creator embeddings 226 may be created using encoding techniques, such as visual transformers, denoted ViT. The generative AI 114 may be used to generate a content item (e.g., image $I_p$) using a prompt p (prompt 117). To determine the attribution of each creator (e.g., creators $A_1$ and $A_2$), the output-based attribution 124 determines a distance measurement 310 of the content embedding $E_{Ip}$ (e.g., of an image $I_p$) to creator embeddings (e.g., $E_{A1}$ and $E_{A2}$). For example, for two creators, distances $d_1$ and $d_2$ are the attribution values used to create the attribution vector 136 of output 118 (e.g., image $I_p$).

In this way, the output to a generative AI is analyzed to identify categories (e.g., characteristics) included in the output. For example, the categories may be broader than what was identified in the output, such as a category "animal" (rather than cat, dog, or the like in the output), a category "furniture" (rather than sofa, chair, table, or the like in the output), a category "jewelry" (rather than earring, necklace, bracelet, or the like in the output) and so on. Each creator has a corresponding description that includes categories (also referred to as creator categories) associated with the content items created by each creator. For example, a creator who creates a painting of a girl with a necklace may have a description that includes categories such as "jewelry", "girl", "adolescent", "female", or the like. The creator categories may include the type of media used by each creator. For example, for art, the categories may include pencil drawings (color or monochrome), oil painting, watercolor painting, charcoal drawing, mixed media painting, and so on. The output-based attribution compares the categories identified in the output with the categories associated with each creator and determines a distance measurement for each category. The distance measurements are then used to create an attribution vector that identifies an amount of attribution for each creator based on the analysis of the output.

FIG. 4 is a block diagram of a system 400 to perform output-based attribution based on creator embeddings, according to some embodiments. The system 400 describes components of the output-based attribution (module) 124 of FIGS. 1, 2, and 3.

Creator identifiers (e.g., creator names) 216(1) to 216(N) and creator descriptions 218(1) to 218(N)) correspond to creators 102(1) to 102(N), respectively. If the system 400 determines that a particular creator 102(X) (0<X<=N) of the creators 102 is identified in the embedding 134, then the particular creator 102(X) may be added to the attribution vector 136. For example, if the embedding 134 includes the creator identifiers "Dali" and "Picasso" then both creators may be added to the attribution vector 136. The system 400 may determine the embedding 134 corresponding to the output 118. A distance determination module 408 may compare the embedding 134 (Et) to creator embeddings 308(1) to 308(N) (e.g., ECi) to determine a distance (e.g., proximity) of the output 118 to individual creators 102. The distance determination module 408 determines a distance (e.g., proximity) using a similarity measure Di, such as a cosine similarity, an Orchini similarity, a Tucker coefficient of congruence, a Jaccard index, a Sorensen similarity index, contrastive learning (e.g., self-supervised learning), or another type of distance or similarity measure, to create distance measurements 310(1) to 310(N) corresponding to the creators 102(1) to 102(N), respectively. As previously described in FIG. 1, attribution vector 136 is used to provide compensation to creators. For example, creator 102(1) may receive compensation 130(1) and creator 102(N) may receive compensation 130(N).

The input 116 may include a prompt, e.g., create content type 402 having content description 404 in the style of creator identifier(s) 406. A caption is text that describes an existing image, whereas a prompt is text that specifies a desired, but currently non-existent image. For example, the text "create a painting of a woman in the style of Picasso and Dali" is a prompt, not a caption. To process the prompt (in the input 116), the text is converted into tokens 412 by an encoder, such as the encoder 228. This may be viewed as one stage in a complex image synthesis pipeline. The tokens 412 are an encoding (e.g., representation) of the text to make the input 116 processable by the generative AI 114. For example, the space between words can be a token, as can be a comma separating words. In a simple case, each word, each punctuation symbol, and each space may be assigned a token. However, a token can also refer to multiple words, or to multiple syllables within a word. There are many words in a language (e.g., English). By grouping the words together to create the tokens 412, the result, as compared to the text in the input 116, is relatively few tokens (e.g., compression) with a relatively high-level meaning. A caption, rather than a prompt, works the other way around. For example, given an image combining the paintings of two artists, an image embedding comprising a vector of numbers (e.g., 512 numbers) of the image may be decoded into the text "a painting of a woman in the style of Dali and Picasso". Converting an image into a vector of numbers and then converting those numbers back into text is referred to as caption extraction.

A creator embedding of Picasso (e.g., 308(P)) and a creator embedding of Dali (e.g., 308(D)) are each vectors of numbers. Each creator embedding 308 may be created as follows. First, images of paintings painted by a creator (e.g., Picasso) are obtained and supplied to encoder 416, with each image having a caption that includes "a painting by Picasso". The encoder 416 turns both the painting and the associated caption into a vector of numbers, e.g., the creator embedding 308(P) associated creator Picasso. During the training phase 101 of FIG. 1, the generative AI 114 (e.g., Stable Diffusion) learns to properly reconstruct an image using a vector of numbers. By causing the generative AI 114 to reconstruct many (e.g., dozens, hundreds, or thousands) of images of Picasso paintings using just the vector of numbers (e.g., 512 numbers) derived from text, the generative AI 114 learns to map the word "Picasso" in the text input to a certain style in the images (e.g., in the output 118) created by the generative AI 114. After the training phase 101 has been completed, the generative AI 114 knows what is meant when the input 116 includes the text "Picasso". From the training phase 101, the generative AI 114 knows exactly which numbers create the embedding 134 to enable generating any type of image in the style of Picasso. In this way, the creator embedding 308(P) associated with Picasso is a vector of numbers that represent the style of Picasso. A similar training process is performed for each creator, such as Dali.

Thus, each creator has a corresponding description that includes categories (also referred to as creator categories or creator characteristics) associated with the content items created by each creator. For example, a creator who creates a painting of a girl with a necklace may have a description that includes categories (characteristics) such as "jewelry", "girl", "adolescent", "female", or the like. The creator categories may include the type of media used by each creator. For example, for art, the categories may include pencil drawings (color or monochrome), oil painting, watercolor painting, charcoal drawing, mixed media painting, and so on. The distance determination module compares the categories identified in the output with the categories associated with each creator to determine a distance (e.g., similarity) measure for each category. The distance measurements are used to create an attribution vector that identifies an amount of attribution for each creator based on the analysis of the output.

FIG. 5 is a block diagram of a system 500 to perform output-based attribution, according to some embodiments. The attribution vector 136 may be created based on determining a similarity (i) between content items 104 of FIG. 1 and the output 118, (ii) between categories 502 (e.g., characteristics) of the output 118 and the categories of each of the content items 104, (iii) between creator embeddings and the output 118 (e.g., as described in FIG. 4), or (iv) any combination thereof.

The system 500 may determine the attribution vector 136 based on the influence of each content item 104 in the training data 108 on the output 118. For example, for content items 104(1) to 104(P), the system 500 may use an encoder 506 (e.g., a visual transformer or similar) to determine a content item embedding 508(1) to 508(P), respectively. The distance determination module 408 may determine a distance (e.g., proximity) between (i) the content item embedding 508 of the output 118 (e.g., image $I_p$) to (ii) each content item embedding 508(1) to 508(P) to create distance measurements 310(1) to 310(P), respectively. The distance measurements 310 may be used to create a content-based attribution vector 510. The system 500 may sum the attribution of the content items 104 of individual content creators 102 to determine the attribution vector 136.

The system 500 may determine the attribution vector 136 based on the influence of output categories 502 (characteristics) of the output 118 with categories included in the content items 104 (in the training data 108). Based on receiving input 116 (e.g., prompt p), the generative AI 114 (e.g., an AI model SD) creates the output 118 (e.g., an image I). The output-based attribution 124 of FIGS. 1, 2, and 3) may be determined for each of the output categories 502. For example, the output 118 may be influenced by (1) the subject (e.g., human portrait) associated with creator 102(1), (2) the artistic medium (e.g., watercolor) associated with creator 102(2), and (3) the mood (e.g., lightning storm) associated with creator 102(3). Using the output categories 502, the system 500 may determine a category-based vector 512. The system 500 may use the category-based vector 512 to create the attribution vector 136, thereby enabling a more fine-grained assessment of artistic attribution as the category-based vector 512 (and attribution vector 136) takes into account various characteristics of the output 118.

The category-based vector 512 may be determined as follows. The content items 104 may be analyzed to identify the categories 138 of FIG. 1 (e.g., characteristics) associated with the training data 108, such as, for example, content (e.g., human portrait, animal portrait, portrait of human with animal, or the like), medium (e.g., oil, watercolor, or the like), style (e.g., renaissance, impressionist, modern, or the like), place (e.g., country, city, ocean, river, lake, or the like), mood (e.g., bright, happy, dark, sad, moody, pain, pleasure, or the like), and the like. The system 500 may create a content item embedding 508 of a text description of each content item 104 in each of the categories 504. For a particular creator 102(N), the system 500 may use either the creator embedding 308(N) or an average of all embeddings of all content 102 associated with the particular creator 102(N) as a proxy for the creator embedding. The system 500 may determine the distance (e.g., proximity) measurements 310 between individual creator embeddings 308 relative all members of each category 504. For the output 118, the system 500 may determine the distance of the embedding 134 to each of the categories 502. The system 500 may compare the two previously determined distances to determine an amount of the influence of each creator 102 on the output 118. For example, when the category-based distances are relatively small (e.g., relatively close proximity), the creator's influence is relatively large and therefore the creator may receive a relatively large amount of attribution in the attribution vector 136. When the category-based distances are relatively large (e.g., relatively far, not very similar), the creator's influence is relatively small and therefore the creator may receive a relatively small (or zero) amount of attribution in the attribution vector 136. As previously described in FIG. 1, attribution vector 136 is used to provide compensation to creators. For example, creator 102(1) may receive compensation 130(1) and creator 102(N) may receive compensation 130(N).

In the flow diagram of FIGS. 6, 7, 8, 9, 11, 12, and 13 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700, 800, 900, 1100, 1200, and 1300 are described with reference to FIGS. 1, 2, 3, 4, and 5 as described above, although other models, frameworks, systems and environments may be used to implement these processes.

FIG. 6 is a flowchart of a process 600 that includes determining a distance measurement between an output embedding and individual creator embeddings, according to some embodiments. The process may be performed by the output-based attribution module 124, the attribution determination module 128, one or more components of the system 400 of FIG. 4, or any combination thereof. A creator embedding associated with each creator may be created and compared to an output embedding identifying creators to determine attribution.

At 602, the process may determine captions describing content items created by a set of creators and assign each creator a unique identifier. For example, in FIG. 2, if available, captions 205 associated with individual content items 204 may be determined. In some cases (e.g., in the absence of captions 205 or to augment the captions 205), a caption extractor, such as CLIP 206, may be used to create captions 208.

At 604, the process may train an AI using training data including the content items, the captions, and the unique identifiers, to create a generative AI. For example, in FIGS. 1 and 2, the AI 112 may be trained using the training data 108, including the content items 204, the unique identifier 216, and the captions 205, 208, to create the generative AI 114.

At 606, the process may create, using an encoder, a creator embedding that describes content items created by individual creators. For example, in FIG. 2, the encoder 228 may be used to create the creator embedding 226 associated with individual creators 102.

At 608, the process may perform an analysis of an output embedding of an output produced by the generative AI. At 610, the process may determine the distance measurement between the output embedding and individual creator embeddings. At 612, the process may determine individual creator attribution is based on the distance measurement between the output embedding and individual creator embeddings. At 614, the process may create a creator attribution vector that includes individual creator attributions. At 616, the process may initiate providing compensation to one or more of the individual creators based on the creator attribution vector. For example, in FIG. 2, the categorization module 210 may perform an analysis of the output 118, including the embedding 134. In FIG. 3, the output-based attribution 124 may determine the distance measurements 310 between the output embedding 134 and individual creator embeddings 226. The output-based attribution 124 may create the attribution vector 136 based on the distance measurements 310. In FIG. 4, the system 400 may initiate providing the compensation 132 individual creators 102 based on the attribution vector 136.

Thus, the embedding associated with the output of a generative AI may be analyzed to identify creators that have influenced the output. The output embedding may be compared with individual creator embeddings to determine a distance between the individual creator embeddings and the output embedding. The attribution vector may be created based on the distance between the individual creator embeddings and the output embedding. The attribution vector may be used to provide compensation to those creators that influenced the output of the generative AI.

FIG. 7 is a flowchart of a process 700 that includes determining a distance measurement between an output embedding and individual content item embeddings, according to some embodiments. For example, the process may be performed by one or more components of the system 500 of FIG. 5. A content item embedding associated with each content item may be created and compared to an output embedding identifying content items to determine attribution.

At 702, the process may train an AI using content items, created by multiple creators, to create a generative AI. For example, in FIG. 1, the training phase 101 may use training data 108 (e.g., that includes content items 104 created by creators 102) to train the AI 112 to create the generative AI 114. The AI 112 may be a pre-trained AI model that has been pre-trained using, for example, open source data sets and the like. The training phase 101 may fine-tune the AI 112 to generate a particular type of content, such as artwork, photographs, music, books, or the like.

At 704, the process may create, using an encoder, a content item embedding corresponding to individual content items. For example, in FIG. 5, the system 500 may create the content embedding 508(1) to 508(P) corresponding to the content items 104(1) to 104(P).

At 706, the process may perform an analysis of an output embedding of an output produced by the generative AI. At 708, the process may determine the distance measurement between the output embedding and individual content item embeddings. At 710, the process may determine individual creator attributions based on the distance measurement between the output embedding an individual content item embeddings (e.g., based on identifying the individual creators that created the content items identified in the output embedding). At 712, the process may create a creator attribution vector that includes individual creator attributions. At 714, the process may initiate providing compensation to one or more of the individual creators based on the creator attribution vector. For example, in FIG. 5, the system 500 may perform an analysis of the embedding 134 of the output 118. The system 500 may determine the distance measurement 310 between individual ones of the content item embeddings 508 and the output embedding 134. The system 500 may create the attribution vector 136 based on the content-based vector 510. The system 500 may initiate providing the compensation 132 one or more of the creators 102.

Thus, the embedding associated with the output of a generative AI may be analyzed to identify content items that have influenced the output. For example, portions of the content items may have been incorporated, either with or without modification, into the output by the generative AI.

The output embedding may be compared with individual content item embeddings to determine a distance between the individual content item embeddings and the output embedding. The attribution vector may be created based on the distance between the individual content item embeddings and the output embedding. The attribution vector may be used to provide compensation to those creators whose content items were the basis for generating the output produced by the generative AI.

FIG. 8 is a flowchart of a process 800 that includes determining a distance measurement between an output embedding and content items based on categories (e.g., characteristics), according to some embodiments. For example, the process 800 may be performed by one or more components of the system 500 of FIG. 5. Categories in an output embedding may be compared with categories in content item embeddings to determine attribution.

At 802, the process may train an AI using content items (created by multiple creators) to create a generative AI. For example, in FIG. 1, the training phase 101 may use training data 108 (e.g., that includes content items 104 created by creators 102) to train the AI 112 to create the generative AI 114. The AI 112 may be a pre-trained AI model that has been pre-trained using, for example, open-source data sets and the like. The training phase 101 may fine-tune the AI 112 to generate a particular type of content, such as artwork, photographs, music, books, or the like.

At 804, the process may determine (e.g., identify or enumerate) categories (e.g., characteristics) associated with the multiple content items. For example, in FIG. 1, during the training phase 101, the training data 108 (e.g., the content items 104) may be analyzed to identify the categories 138 (e.g., characteristics) of the content items 104 in the training data 108.

At 806, the process may create, using an encoder, an embedding for each category. At 808, the process may determine a category vector describing individual content items. At 810, the process may perform an analysis of an output embedding of an output produced by the generative AI. At 812, the process may determine categories in the output embedding. At 814, the process may determine a distance measurement between categories in the output embedding and content items associated with individual creators. At 816, the process may create a creator attribution vector that in includes individual creator attributions based on the distance and the analysis. At 818, the process may initiate providing compensation to one or more of the individual creators based on the creator attribution vector. For example, in FIG. 5, the content items 104 may be analyzed to identify the categories 138 of FIG. 1 (e.g., characteristics) associated with the training data 108, such as, for example, content (e.g., human portrait, animal portrait, portrait of human with animal, or the like), medium (e.g., oil, watercolor, or the like), style (e.g., renaissance, impressionist, modern, or the like), place (e.g., country, city, ocean, river, lake, or the like), mood (e.g., bright, happy, dark, sad, moody, pain, pleasure, or the like), and the like. The system 500 may create a content item embedding 508 of a text description of each content item 104 in each of the categories 504. For a particular creator 102(N), the system 500 may use either the creator embedding 308(N) or an average of all embeddings of all content 102 associated with the particular creator 102(N) as a proxy for the creator embedding. The system 500 may determine the distance (e.g., proximity) measurements 310 between individual creator embeddings 308 relative all members of each category 504. For the output 118, the system 500 may determine the distance of the embedding 134 to each of the categories 502. The system 500 may compare the two previously determined distances to determine an amount of the influence of each creator 102 on the output 118. For example, when the category-based distances are relatively small (e.g., relatively close proximity), the creator's influence is relatively large and therefore the creator may receive a relatively large amount of attribution in the attribution vector 136. When the category-based distances are relatively large (e.g., relatively far, not very similar), the creator's influence is relatively small and therefore the creator may receive a relatively small (or zero) amount of attribution in the attribution vector 136.

Figure 9:
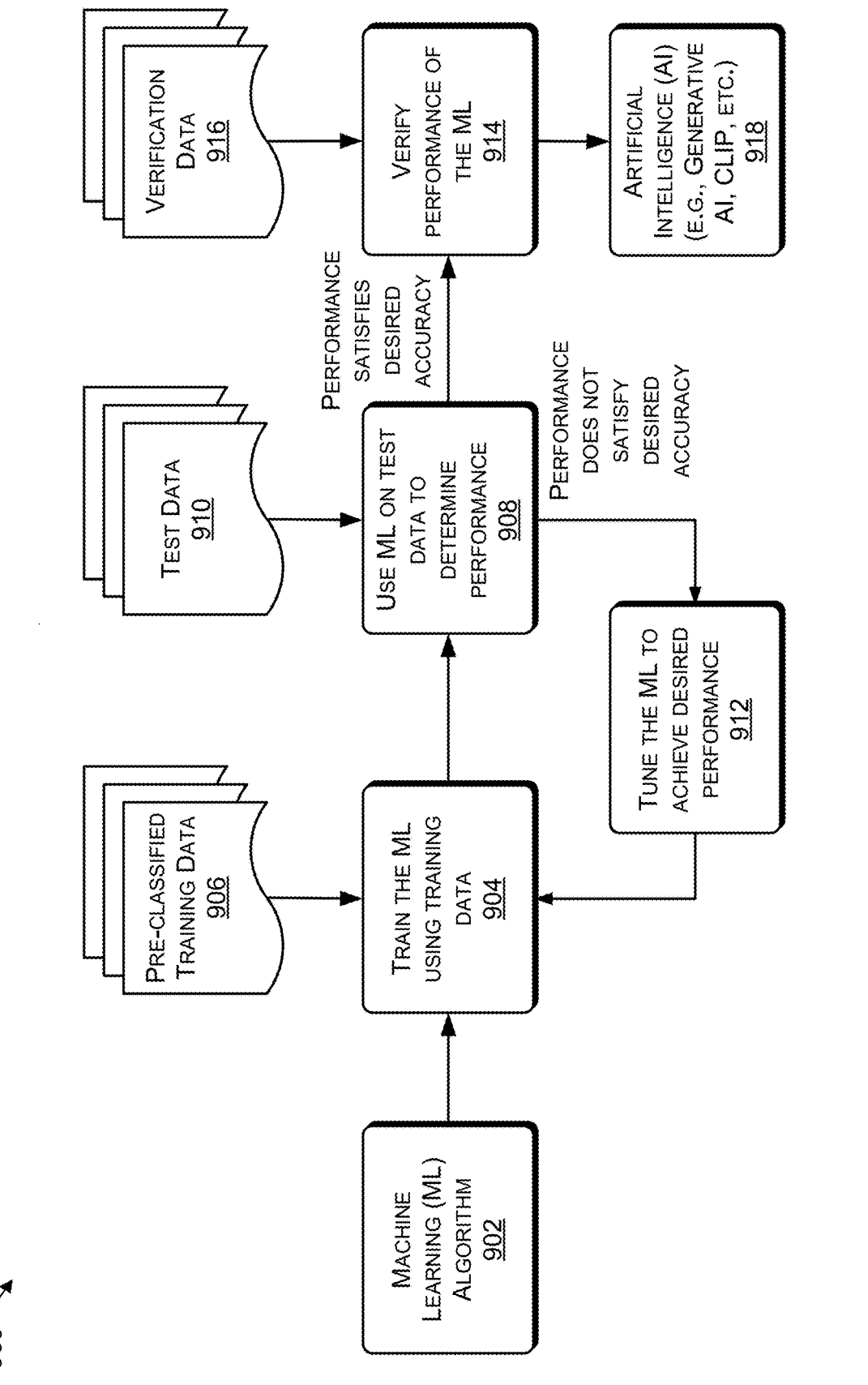
FIG. 9 is a flowchart of a process to train a machine learning algorithm, according to some embodiments.

FIG. 9 is a flowchart of a process 900 to train a machine learning algorithm, according to some embodiments. For example, the process 900 may be performed during the training phase 101 of FIG. 1.

At 902, a machine learning algorithm (e.g., software code) may be created by one or more software designers. For example, the generative AI 112 of FIGS. 1 and 3 may be created by software designers. At 904, the machine learning algorithm may be trained (e.g., fine-tuned) using pre-classified training data 906. For example, the training data 906 may have been pre-classified by humans, by machine learning, or a combination of both. After the machine learning has been trained using the pre-classified training data 906, the machine learning may be tested, at 908, using test data 910 to determine a performance metric of the machine learning. The performance metric may include, for example, precision, recall, Frechet Inception Distance (FID), or a more complex performance metric. For example, in the case of a classifier, the accuracy of the classification may be determined using the test data 910.

If the performance metric of the machine learning does not satisfy a desired measurement (e.g., 95%, 98%, 99% in the case of accuracy), at 908, then the machine learning code may be tuned, at 912, to achieve the desired performance measurement. For example, at 912, the software designers may modify the machine learning software code to improve the performance of the machine learning algorithm. After the machine learning has been tuned, at 912, the machine learning may be retrained, at 904, using the pre-classified training data 906. In this way, 904, 908, 912 may be repeated until the performance of the machine learning is able to satisfy the desired performance metric. For example, in the case of a classifier, the classifier may be tuned to classify the test data 910 with the desired accuracy.

After determining, at 908, that the performance of the machine learning satisfies the desired performance metric, the process may proceed to 914, where verification data 916 may be used to verify the performance of the machine learning. After the performance of the machine learning is verified, at 914, the machine learning 902, which has been trained to provide a particular level of performance may be used as an artificial intelligence (AI) 918. For example, the AI 918 may be the (trained) generative AI 114 of FIGS. 1, 2, 3, 4, and/or the caption extractor 206 (CLIP neural network) of FIG. 2.

Figure 10:
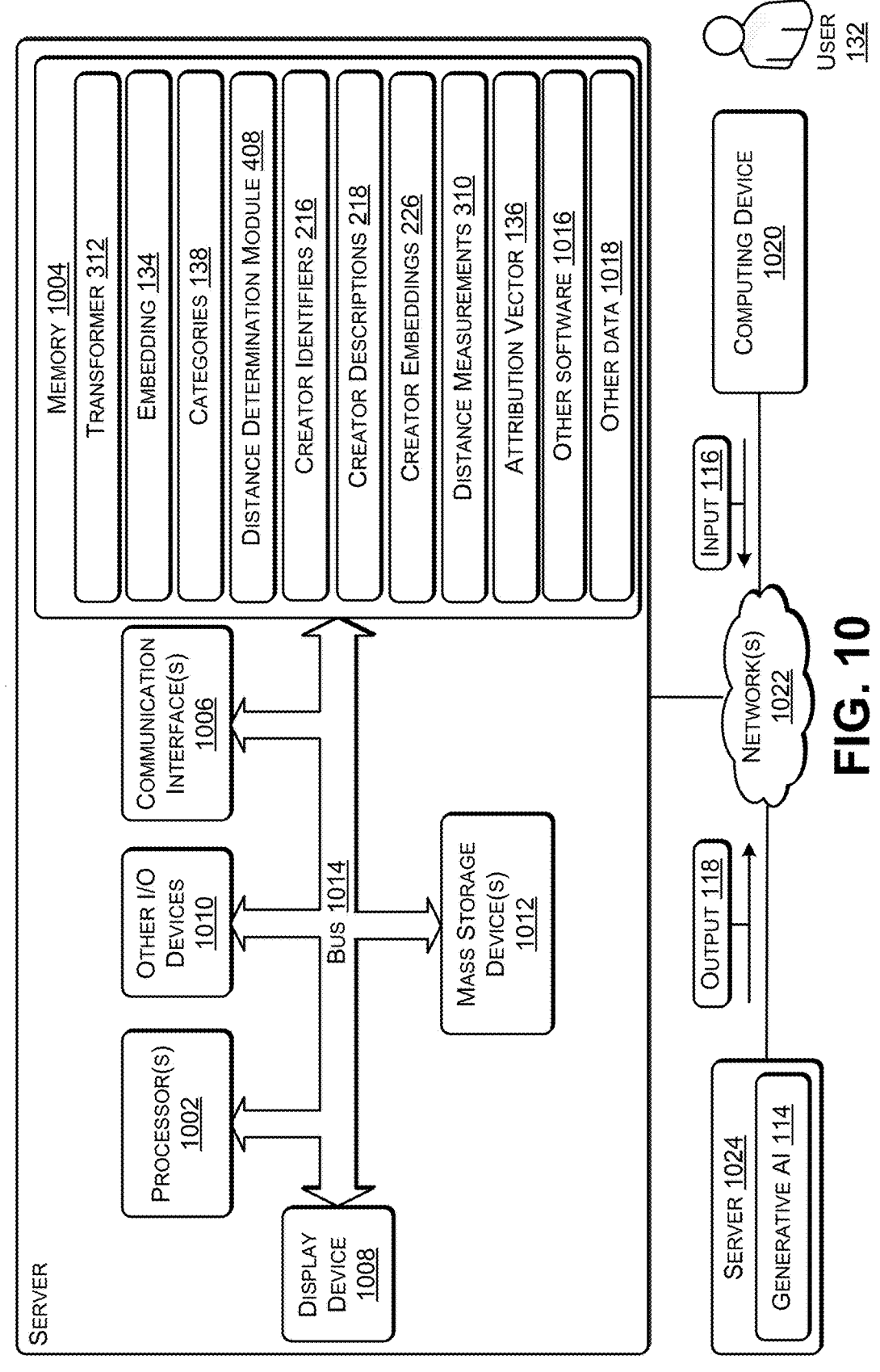
FIG. 10 illustrates an example configuration of a computing device that can be used to implement the systems and techniques described herein.

FIG. 10 illustrates an example configuration of a device 1000 that can be used to implement the systems and techniques described herein. For example, the device 1000 may be a server (or a set of servers) used to host one or more of the components described in FIGS. 1, 2, 3, 4, and 5. In some cases, the systems and techniques described herein may be implemented as an application programming interface (API), a plugin, or another type of implementation.

The device 1000 may include one or more processors 1002 (e.g., central processing unit (CPU), graphics processing unit (GPU), or the like), a memory 1004, communication interfaces 1006, a display device 1008, other input/output (I/O) devices 1010 (e.g., keyboard, trackball, and the like), and one or more mass storage devices 1012 (e.g., disk drive, solid state disk drive, or the like), configured to communicate with each other, such as via one or more system buses 1014 or other suitable connections. While a single system bus 1014 is illustrated for ease of understanding, it should be understood that the system bus 1014 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), high definition media interface (HDMI), and the like), power buses, etc.

The processors 1002 are one or more hardware devices that may include a single processing unit or a number of processing units, all of which may include single or multiple computing units or multiple cores. The processors 1002 may include a graphics processing unit (GPU) that is integrated into the CPU or the GPU may be a separate processor device from the CPU. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., random access memory (RAM), read only memory (ROM), or the like) devices. Further, mass storage devices 1012 may include hard disk drives, solid-state drives, removable media, including external and removable drives, memory cards, flash memory, floppy disks, optical disks (e.g., compact disc (CD), digital versatile disc (DVD), a storage array, a network attached storage (NAS), a storage area network (SAN), or the like. Both memory 1004 and mass storage devices 1012 may be collectively referred to as memory or computer storage media herein and may be any type of non-transitory media capable of storing computer-readable, processor-executable program instructions as computer program code that can be executed by the processors 1002 as a particular machine configured for carrying out the operations and functions described in the implementations herein.

The device 1000 may include one or more communication interfaces 1006 for exchanging data via the network 110. The communication interfaces 1006 can facilitate communications within a wide variety of networks and protocol types, including wired networks (e.g., Ethernet, Data Over Cable Service Interface Specification (DOCSIS), digital subscriber line (DSL), Fiber, universal serial bus (USB) etc.) and wireless networks (e.g., wireless local area network (WLAN), global system for mobile (GSM), code division multiple access (CDMA), 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

The display device 1008 may be used for displaying content (e.g., information and images) to users. Other I/O devices 1010 may be devices that receive various inputs from a user and provide various outputs to the user, and may include a keyboard, a touchpad, a mouse, a gaming controller (e.g., joystick, steering controller, accelerator pedal, brake pedal controller, virtual reality (VR) headset, VR glove, or the like), a printer, audio input/output devices, and so forth.

The computer storage media, such as memory 1004 and mass storage devices 1012, may be used to store any of the software and data described herein, including, for example, the transformer 312, the embedding 134, the categories 138, the distance determination module 408, the creator identifiers 216, the creator descriptions 218, the creator embeddings 226, the distance (e.g., proximity) measurements 310, the attribution vector 136, other software 1016, and other data 1018.

The user 132 (e.g., secondary creator) may use a computing device 1020 to provide the input 116, via one or more networks 1022, to a server 1024 that hosts the generative AI 114. Based on the input 116, the server 1024 may provide the output 118. The device 1000 may be used to implement the computing device 1020, the server 1024, or another device.

FIG. 11 is a flowchart of a process 1100 to perform composition and style attribution of a musical piece (song) to determine attribution, according to some embodiments. The process may be performed by one or more components of the system 100 of FIG. 1.

At 1102, the process creates a first of two groups that includes training data (songs) having a same composition but with different recording styles. At 1104, the process creates a second of the two groups that includes training data (songs) having a same recording style but with different compositions. At 1106, the process trains a composition and style AI model (CSM) using pairs of embeddings from each of the two groups. Each pair of embeddings is selected from one of the two groups. The CSM is trained to create two song embeddings that are similar to each other, with the difference between the two embeddings being a training loss. At 1108, the process may train the CSM to minimize the training loss, enabling the CSM to extract embeddings that are similar from (1) songs with identical compositions and (2) songs with similar styles. At 1110 the process may implement the CSM using a first output head to identify composition similarities and a second output head to identify style similarities. 1102, 1104, 1106, 1108, and 1110 are performing during the training phases 101. For example, in FIG. 1, to extract the composition data 120 and style data 122, the output-based attribution 124 may use the CSM 180. The CSM 180 may be trained (during the training phase 101) using data 108 that includes songs in at least the two groups 148(1) and 148(2). For example, when the content items 104 are musical pieces (songs), the musical pieces may be grouped into the groups 148(1) and 148(2). Group 148(1) includes songs that share a same composition but may feature different recording styles. For example, group 148(1) may include covers of famous songs or augmented versions of songs where elements (e.g., pitch, key, post-processing filters, or the like) were changed from the original recording. Group 148(1) may be referred to as composition songs. Group 148(2) includes songs with the same recording style, but with different compositions, such as songs from a single album of a band or a singer, where the same (or similar)

instruments, vocalists, and effects are used for all songs, even though the melodies are different across all tracks. Group 148(2) may be referred to as style songs. The CSM 180 is trained using pairs of embeddings of the songs, from the same group, e.g., each pair comprises two composition songs (two songs from 148(1)) or two style songs (two songs from 148(2)). The CSM 180 is trained to create high-level embeddings of the song embeddings that are as similar to each other as possible. In this way, two composition songs are embedded in the same way regardless of the differences in recording style and two style songs are embedded the same way regardless of their differing compositions. To achieve this, the CSM 180 creates a high-level embedding of each training song in each pair of training songs. Then, the difference between the embeddings of the two songs from the same group is used as the training loss. During training 110, the training loss is minimized, enabling the CSM 180 to extract similar (almost identical) embeddings from songs with identical composition and to extract similar (almost identical) embeddings for songs with the same style. For example, the training loss may be minimized using contrastive learning, where a third song that is from a different composition or recording is also embedded. In this example, the loss comprises the similarity of the two songs from the same group combined with the dissimilarity of the two songs to the third song that is different. The two similar songs have embeddings that are very similar and very dissimilar from the third song. In some cases, the CSM 180 may be implemented with two output heads 150(1) and 150(2), one for composition and one for style, respectively. The heads 150 of a neural network refer to the last layer(s) where the features extracted in the main body of the AI (CSM 180) are used for a specific task. For example, an AI model, such as Contrastive Language-Audio Pretraining (CLAP), can extract generic features, which can then be fed into multiple separate, smaller networks which are called the heads. Here, the output of these heads 150 is the specialized value(s) being determined, such as compositional attribution 162 and stylistic attribution 164. Heads whose output is used for specific types of attribution are referred to as "output heads", to distinguish from the output of the underlying feature extractor, CLAP. The CSM 180 includes a shared encoder 152 that extracts initial information from the song/song embedding 134. After the initial information is extracted, the composition head 150(1) generates embeddings that are nearly identical, for any two composition songs (from group 148(1)) that have a similar composition while the recording head 150(2) generates embeddings that are nearly identical for any two style songs (from group 148(2)) that have similar styles. The CSM 180 may be used to derive the attribution vector 136 from the output 118 by feeding the output 118 into the dual heads 150 of the CSM 180. The composition output of head 150(1) is compared, using a comparator 158, to the composition output of every training song (in groups 148). The style output of head 150(2) is compared, using the comparator 158, to the style output of every training song (in groups 148). A similarity measure (e.g., cosine similarity, Euclidean Distance, Jaccard similarity, or anther type of similarity measurement) is used to determine a composition distance 154 and a style distance 156 for the generated output 118. The two distances 154, 156 are used to derive composition attribution 162 and style attribution 164 by the attribution determination module 128 to determine the compensation 130 for both composition and style for the creators 102 that created the training items 104 (that are grouped into groups 148).

At 1112, the process may determine the user has provided input to a generative AI to create an output (song). At 1114, the process may determine, using the CSM, an output embedding associated with the output including a composition embedding and a style embedding. At 1116, the process may create a creator attribution vector that includes individual creator attributions (e.g., based on composition embeddings and style embeddings. At 1118, the process may initiate providing compensation to one or more individual creators based on the creator attribution vector. For example, in FIG. 1, the user 132 may provide the input 116 to the generative AI 114 to create the output 118 (song). The output-based attribution 124 may determine, using the CSM 180, the output embedding 134 associated with the output 118 including a composition embedding and a style embedding. The output-based attribution 124 may create the creator attribution vector 136 that includes individual creator attributions (e.g., based on composition embeddings and style embeddings) and initiate providing compensation 130 to one or more of individual creators 102 based on the creator attribution vector 136. 1112, 1114, 1116, 1118 are performed after the training phase of the generative AI has been completed, during a generative phase.

Thus, a song generated by AI may be analyzed to identify compositional similarities between the generated song and the training data and to identify stylistic similarities between the generated song and the training data. The compositional similarities and the stylistic similarities may be used to determine attribution in the form of an attribution vector. The attribution vector may be used to compensate one or more creators that contributed content items (songs) to the training data.

FIG. 12 is a flowchart of a process 1200 to perform multi-scale topological analysis of a musical piece (song) to determine attribution, according to some embodiments. The process may be performed by one or more components of the system 100 of FIG. 1.

At 1202, the process may segment individual songs (in training data and in generated output) into multiple time segments of different lengths of time and into multiple frequency segments using different frequency bands. At 1204, the process may build a time similarity graph for the multiple time segments and a frequency similarity graph for the multiple frequency segments. At 1206, the process may maintain the time similarity graph and frequency similarity graph across multiple generations. At 1208, the process may perform clustering for the time similarity graph and for the frequency similarity graph. At 1210, the process may perform clustering for the time similarity graph and the frequency similarity graph. At 1212, the process may segment and AI generated song based on time and based on frequency to create generated song segments. At 1214, the process may add the generated song segments to the time similarity graph and the frequency similarity graph and cluster the generated song segments. At 1216, the process may create, based on the similarity graphs and based on the clustering, a creator attribution vector that includes individual creator attributions. At 1218, the process may initiate providing compensation to one or more of the individual creators based on the creator attribution graph.

For example, in FIG. 1, the attribution determination module 128 may analyze the output 118 using multiple scales and a topology of influence 142. Musical attribution may be evident across the entire song to a large amount or musical attribution may be present in low amounts and/or in some segments of the output 118. For example, if the output 118 blatantly copies an existing song (from the training data), the attribution to that song might be 95% throughout the entire duration of the output 118. However, in some cases, the output 118 might use a small part of the guitar riff of the intro, a small vocal hook of the verse, and a piano sequence in the chorus. In such cases (subtler), the attribution might not exceed 30% of any individual segment (intro, verse, chorus etc.) of the song, and may be limited to just one stem at a time. However, these more subtle influences can still add up to the output 118 effectively copying from different portions of the original song. When the output 118 is fed back into (provided as input 116 to) the AI 114 again to create a second output based on the first output 118, the system 100 may keep track of attribution across multiple generations by maintaining a multi-scale topological attribution record across one or more generations based on the output 118. Each song (both in the training data and in the output 118) may be divided by a segmentation module 166 into multiple time segments 168 of different lengths (e.g., X seconds, X>0, such as 15, 30, 60, 90 seconds) and multiple frequency segments 170 using different frequency bands (e.g., 20-100 Hertz (Hz), 101-500 Hz, 501-1000 Hz, 1001-4000 Hz, 4001-15,000 Hz) to create multiple bands with multiple lengths. The attribution techniques described herein may be applied at multiple temporal and multiple spectral levels to create multi-scale embeddings. The multi-scale embeddings may be used to build a similarity graph 144 for segments 168, 170 of the output 118 along with the multi-scale embeddings of the training data (items 104). Even if the output 118 does not have any obvious influences, this approach identifies weak influences and similarities to the training corpus (items 104). The similarity graph 144 may be maintained across multiple generations, e.g., output 1 is generated, output 2 is generated based on output 1, output 3 is generated based on output 2, and so on. In this way, similarities and influences are tracked across multiple outputs. If a new output is based on a previous AI-generated output, the system 100 can keep track of influences (attribution) across multiple generations. If a particular influence get stronger with each generation, this particular influence is identified and kept track of. Clustering 146 of the resulting similarity graph 144 enables this process to remain computationally feasible and enables similarities to be detected among multiple time segments 168 and multiple frequency segments 170, regardless of which time or frequency spectrum they are from. The amount of clusters in the clustering 146 may be used to further quantify attribution. For example, if the output 118 shows similarity to the training data 108 in multiple scales and in multiple segments, the attribution may be higher than if a similarity of the same strength is found only in one segment. Thus, the multi-scale approach detects influences in multiple time segments 168 and/or multiple frequency segments 170, down to a granularity of time segments comprising a few seconds and/or frequency segments of a few Hertz.

Thus, songs in training data and a generated song (generated by AI) may each be segmented into multiple time segments having different lengths of time and into multiple frequency segments based on different frequency bands. A time similarity graph and a frequency similarity graph may be created for the time segments and the frequency segments, respectively. In some cases, the time segments and the frequency segments may be clustered such that similar segments are clustered together (into a same cluster) while dissimilar segments are placed into different clusters. The generated song may be segmented and the segments of the generated song placed in the similarity graphs and/or clustered to identify similarities to enable attribution. The similarity graphs and/or the clusters may be used to create an attribution vector to provide compensation to individual creators.

FIG. 13 is a flowchart of a process 1300 to perform semantic analysis of a musical piece (song) to determine attribution, according to some embodiments. The process may be performed by one or more components of the system 100 of FIG. 1.

At 1302, the process may perform semantic segmentation of an AI-generated song (output by the AI) to identify core segments in the song, such as chorus, verse, bridge, and the like. At 1304, the process may perform attribution analysis by identifying which elements of the AI generated song are influenced by training data and by how much. At 1306, the process may segment the AI generated song into stems (e.g., vocals, guitar, bass, keyboards, drums, and the like) and identify melodies across individual stems and/or stem combinations. At 1308, the process may identify musical patterns using multi-pitch of melody extraction in the AI generated song. At 1310, the process may perform melody abstraction by extracting MIDI data describing the AI generated song. At 1312, the process may compare the MIDI data to training MIDI data associated with the training data. At 1314, the process may embed the MIDI data using an encoder and compare the MIDI embedding of the AI generated song (output by the AI) to MIDI embeddings associated with the training data. At 1316, the process may combine semantic similarities to determine (1) an overall quantification of attribution and (2) a detailed report indicating how each segment, each melody, and each instrument heard in the AI generated song was influenced by melodies and instruments in the training data. At 1318, the process may create an attribution vector and initiates providing compensation to one or more individual creators.

For example, in FIG. 1, the system 100 may use semantic analysis 140 that analyzes the song (output 118) as multiple semantically meaningful components. In semantic analysis 140, the song (output 118) is analyzed as a whole and broken down into larger, more meaningful segments 168, 170. The semantic analysis (module) 140 performs semantic segmentation to identify core segments 172 of the song (output 118), such as choruses, verses, bridges, and the like. The attribution determination 128 applies the attribution techniques described herein to the core segments 172, identifying which elements of the AI-generated song (output 118) are influenced by the training data 108 and by how much. The semantic analysis 140 identifies consistent musical patterns throughout a song (output 118), including multi-pitch melody extraction. A melody may be included throughout the whole song or may only appear in portions of the song. The semantic analysis 140 identifies the presence of a melody regardless of how often or how consistently it appears. For example, the melody is recognized even when it is transposed to a different key (frequency). The melody may be extracted using signal processing techniques such as f0 (fundamental frequency) extraction, or using a deep-learning AI trained to extract melodies from songs. The melodies may be quantified as half-step difference sequences together with the time steps at which a note changes, combined with variable information such as the key and pitch in which the melody was recorded. The melodies (in the core segments 172) identified in the output 118 may be compared to the melodies identified in the training data 108, either directly by determining a similarity measure (such as cosine similarity), or by embedding the melodies using an encoder as described herein and comparing the embeddings. The melody extraction (part of semantic analysis 140) may be refined by first splitting the song into stems (e.g., vocals, guitar, piano, bass, keyboards, and the like) of the song and then identifying melodies across individual stems and/or combination of stems. Thus, the semantic analysis 140 may determine how a particular stem of the output 118 is influenced by one or more stems in the original training data 108. The melody extraction may be further abstracted from individual instruments by extracting the underlying musical instrument digital interface (MIDI) description of the output. The MIDI data may be extracted either via signal processing such as f0 extraction, or by using deep-learning techniques trained in a supervised way with songs and their corresponding MIDI annotations. The MIDI descriptions extracted from the output 118 (song) may be compared either directly to the MIDI data of the training data 108, or by embedding the MIDI data with an encoder and comparing the MIDI embedding of the output 118 to MIDI embeddings of the training data 108. Semantic similarities can be combined to allow both an overall quantification of attribution as well as a detailed report of how each segment, each melody, and each instrument heard in the output 118 (song) was influenced by the melodies and instruments in the training data 108.

Thus, semantic segmentation may be used to segment a song into core segments (verse, chorus, bridge, intro, outro, and the like). In some cases, attribution analysis, as described herein, may be performed to determine which elements of the AI-generated song are influenced by the training data and by how much. In some cases, the AI-generated song may be segmented into stems (vocals, guitar, bass, and the like) and melodies identified across individual stems and/or a combination of stems. Melody abstraction may be performed by extracting MIDI data describing the AI-generated song. The MIDI data of the AI-generated song may be compared to MIDI data associated with the training data to determine attribution. For example, an encoder may be used to compare an embedding of the AI-generated song with embeddings of the MIDI data associated with the training data.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

segmenting, by one or more processors, a music-based output produced by a generative artificial intelligence, into multiple segments by:

identifying, using multi-pitch melody extraction, one or more musical patterns in the music-based output; and determining one or more data abstractions, wherein individual data abstractions of the one or more data abstractions are abstractions of individual musical patterns of the one or more musical patterns;

generating, by an encoder executed by the one or more processors, multiple output embeddings, wherein individual output embeddings of the multiple output embeddings are derived from individual segments of the multiple segments;

determining, by the one or more processors, a distance measurement between individual output embeddings of the multiple output embeddings and individual training segment embeddings of multiple training segment embeddings to create a plurality of distance measurements;

correlating, by the one or more processors, the plurality of distance measurements to a plurality of content creators that created multiple content items used to train the generative artificial intelligence;

determining, by the one or more processors, one or more creator attributions based at least in part on correlating the plurality of distance measurements to the plurality of content creators;

determining, by the one or more processors, a creator attribution vector that includes the one or more creator attributions; and initiating, by the one or more processors, providing compensation to one or more content creators of the plurality of content creators based on the creator attribution vector.

2. The method of claim 1, wherein segmenting the music-based output produced by the generative artificial intelligence into multiple segments comprises:

performing semantic segmentation of the music-based output into multiple core segments.

3. The method of claim 2, wherein the multiple core segments comprise at least two of:

an intro;

a verse;

a pre-chorus;

a chorus;

a post-chorus;

a bridge;

a solo;

a break;

an interlude; or an outro.

4. The method of claim 1, wherein the generative artificial intelligence comprises:

a latent diffusion model;

a generative adversarial network;

a generative pre-trained transformer;

a variational autoencoder;

a multimodal model; or any combination thereof.

5. The method of claim 1, wherein the individual data abstractions comprise musical instrument data interface (MIDI) data.

6. The method of claim 1, further comprising:

segmenting the music-based output into a plurality of stems;

identifying one or more melodies in individual stems of the plurality of stems; and identifying one or more melodies in combinations of two or more stems from the plurality of stems.

7. The method of claim 6, wherein the plurality of stems comprise at least two of:

a vocal stem;

a guitar stem;

a bass stem;

a keyboard stem; or a drum stem.

8. A server comprising:

one or more processors; and one or more non-transitory computer-readable storage media to store instructions executable by the one or more processors to perform operations comprising:

segmenting a music-based output produced by a generative artificial intelligence, into multiple segments by:

segmenting the music-based output into a plurality of stems;

identifying one or more melodies in individual stems of the plurality of stems; and identifying one or more melodies in combinations of two or more stems from the plurality of stems;

generating, by an encoder, multiple output embeddings, wherein individual output embeddings of the multiple output embeddings are derived from individual segments of the multiple segments;

determining a distance measurement between individual output embeddings of the multiple output embeddings and individual training segment embeddings of multiple training segment embeddings to create a plurality of distance measurements;

correlating the plurality of distance measurements to a plurality of content creators that created multiple content items used to train the generative artificial intelligence;

determining one or more creator attributions based at least in part on correlating the plurality of distance measurements to the plurality of content creators;

determining a creator attribution vector that includes the one or more creator attributions; and initiating providing compensation to one or more content creators of the plurality of content creators based on the creator attribution vector.

9. The server of claim 8, the operations further comprising:

performing semantic segmentation of the music-based output into multiple core segments.

10. The server of claim 9, wherein the multiple core segments comprise at least two of:

an intro;

a verse;

a pre-chorus;

a chorus;

a post-chorus;

a bridge;

a solo;

a break;

an interlude; or an outro.

11. The server of claim 8, the operations further comprising:

identifying, using multi-pitch melody extraction, one or more musical patterns in the music-based output; and determining one or more data abstractions, wherein individual data abstractions of the one or more data abstractions are abstractions of individual musical patterns of the one or more musical patterns.

12. The server of claim 11, wherein the individual data abstractions comprise musical instrument data interface (MIDI) data.

13. The server of claim 8, the operations further comprising:

extracting composition data and style data using a composition and style artificial intelligence comprising:

a composition head to determine compositional attribution for the plurality of content creators; and a style head to perform stylistic attribution for the plurality of content creators.

14. The server of claim 8, wherein the plurality of stems comprise at least two of:

a vocal stem;

a guitar stem;

a bass stem;

a keyboard stem; or a drum stem.

15. A non-transitory memory device to store instructions executable by one or more processors to perform operations comprising:

segmenting a music-based output produced by a generative artificial intelligence, into multiple segments, by:

identifying, using multi-pitch melody extraction, one or more musical patterns in the music-based output; and determining one or more data abstractions, wherein individual data abstractions of the one or more data abstractions are abstractions of individual musical patterns of the one or more musical patterns;

generating, by an encoder executed, multiple output embeddings, wherein individual output embeddings of the multiple output embeddings are derived from individual segments of the multiple segments;

determining a distance measurement between individual output embeddings of the multiple output embeddings and individual training segment embeddings of multiple training segment embeddings to create a plurality of distance measurements;

correlating the plurality of distance measurements to a plurality of content creators that created multiple content items used to train the generative artificial intelligence;

determining one or more creator attributions based at least in part on correlating the plurality of distance measurements to a plurality of content creators;

determining a creator attribution vector that includes the one or more creator attributions; and initiating providing compensation to one or more content creators of the plurality of content creators based on the creator attribution vector.

16. The non-transitory memory device of claim 15, further comprising:

performing semantic segmentation of the music-based output into multiple core segments.

17. The non-transitory memory device of claim 16, wherein the multiple core segments comprise at least two of:

an intro;

a verse;

a pre-chorus;

a chorus;

a post-chorus;

a bridge;

a solo;

a break;

an interlude; or an outro.

18. The non-transitory memory device of claim 15, wherein:

the music-based output comprises a digital music composition; and the one or more content creators comprise one or more musicians, one or more songwriters, or any combination thereof.

19. The non-transitory memory device of claim 15, the operations further comprising:

segmenting the music-based output into a plurality of stems;

identifying one or more melodies in individual stems of the plurality of stems; and identifying one or more melodies in combinations of two or more stems from the plurality of stems.

20. The non-transitory memory device of claim 19, wherein the plurality of stems comprise at least two of:

a vocal stem;

a guitar stem;

a bass stem;

a keyboard stem; or a drum stem.

* * * * *